US012659286B2

(12) United States Patent
Hellman

(10) Patent No.: US 12,659,286 B2
(45) Date of Patent: ***Jun. 16, 2026

(54) ONLINE FEEDBACK SYSTEM

(71) Applicant: MATTERAPP INC., Chapel Hill, NC (US)

(72) Inventor: Brett Hellman, Chapel Hill, NC (US)

(73) Assignee: MATTERAPP INC., San Francisco, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 18/972,344

(22) Filed: Dec. 6, 2024

(65) Prior Publication Data

US 2025/0106180 A1 Mar. 27, 2025

Related U.S. Application Data

(63) Continuation-in-part of application No. 17/965,513, filed on Oct. 13, 2022, now Pat. No. 12,199,935.

(60) Provisional application No. 63/256,119, filed on Oct. 15, 2021.

(51) Int. Cl.
*H04L 51/216* (2022.01)
*G06Q 30/0217* (2023.01)
*H04L 51/04* (2022.01)

(52) U.S. Cl.
CPC ....... *H04L 51/216* (2022.05); *G06Q 30/0217* (2013.01); *H04L 51/04* (2013.01)

(58) Field of Classification Search
CPC .......................... H04L 51/216; G06Q 30/0217
See application file for complete search history.

(56) References Cited

U.S. PATENT DOCUMENTS

2017/0076238 A1* 3/2017 Bastide ............ G06Q 10/06398
2019/0272476 A1* 9/2019 Vontobel ................ G06N 20/00

OTHER PUBLICATIONS

United States Office Action, U.S. Appl. No. 17/965,513, filed May 31, 2024, 11 pages.

* cited by examiner

*Primary Examiner* — Suraj M Joshi
(74) *Attorney, Agent, or Firm* — Fenwick & West LLP

(57) ABSTRACT

A method or system for facilitating feedback exchange among users. The system tracks messages exchanged among users in the channel and, based on this tracking, generates and displays a reminder for a first user to send feedback to a second user. The system further displays the first user's total virtual currency balance, receives a text entry and an amount of virtual currency from the first user for the second user, and generates a feedback message based on the text entry. The feedback message, accompanied by the specified amount of virtual currency, is then sent to the second user, and the virtual currency is transferred from the first user's virtual bank account to the second user's account. The system also calculates statistics related to feedback exchanges within the channel and generating a summary message displaying these statistics, thereby enhancing engagement and recognition among users in the channel.

20 Claims, 26 Drawing Sheets

400

Track messages sent to and from users of a channel
405

Generate and display to a first user of the channel a reminder to send feedback to a second user of the channel based on the tracked messages between users of the channel 410

Receive from the first user activating an interactive element of the reminder
415

Suggest and display a plurality of message templates for the feedback
420

Receive from the first user a selection of one of the message templates and a text entry
425

Generate a feedback message based on the selected message template and the text entry 430

Send the feedback message from the first user to the second user
435

400

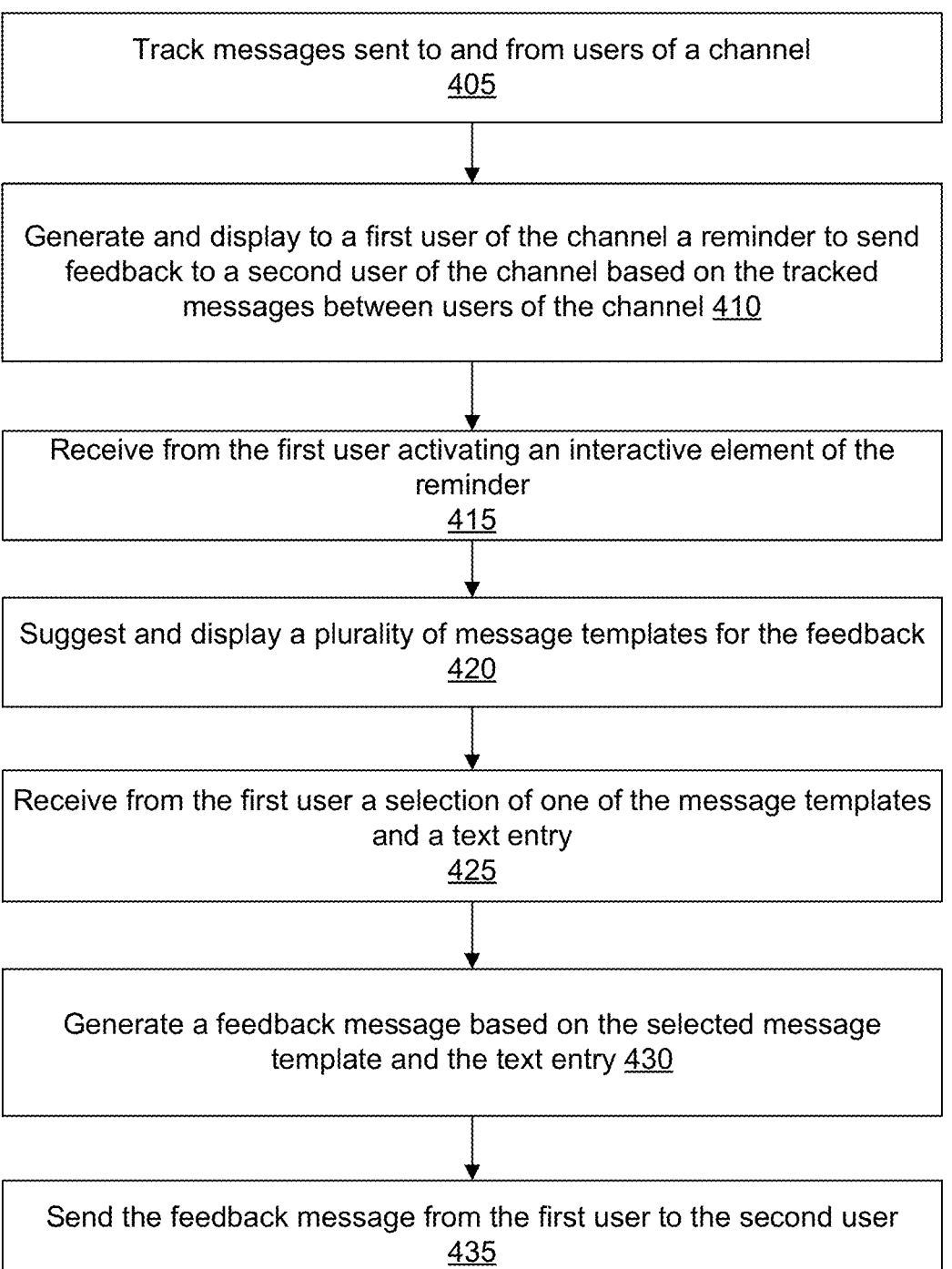

Track messages sent to and from users of a channel
405

Generate and display to a first user of the channel a reminder to send feedback to a second user of the channel based on the tracked messages between users of the channel 410

Receive from the first user activating an interactive element of the reminder
415

Suggest and display a plurality of message templates for the feedback
420

Receive from the first user a selection of one of the message templates and a text entry
425

Generate a feedback message based on the selected message template and the text entry 430

Send the feedback message from the first user to the second user
435

Figure 5F:
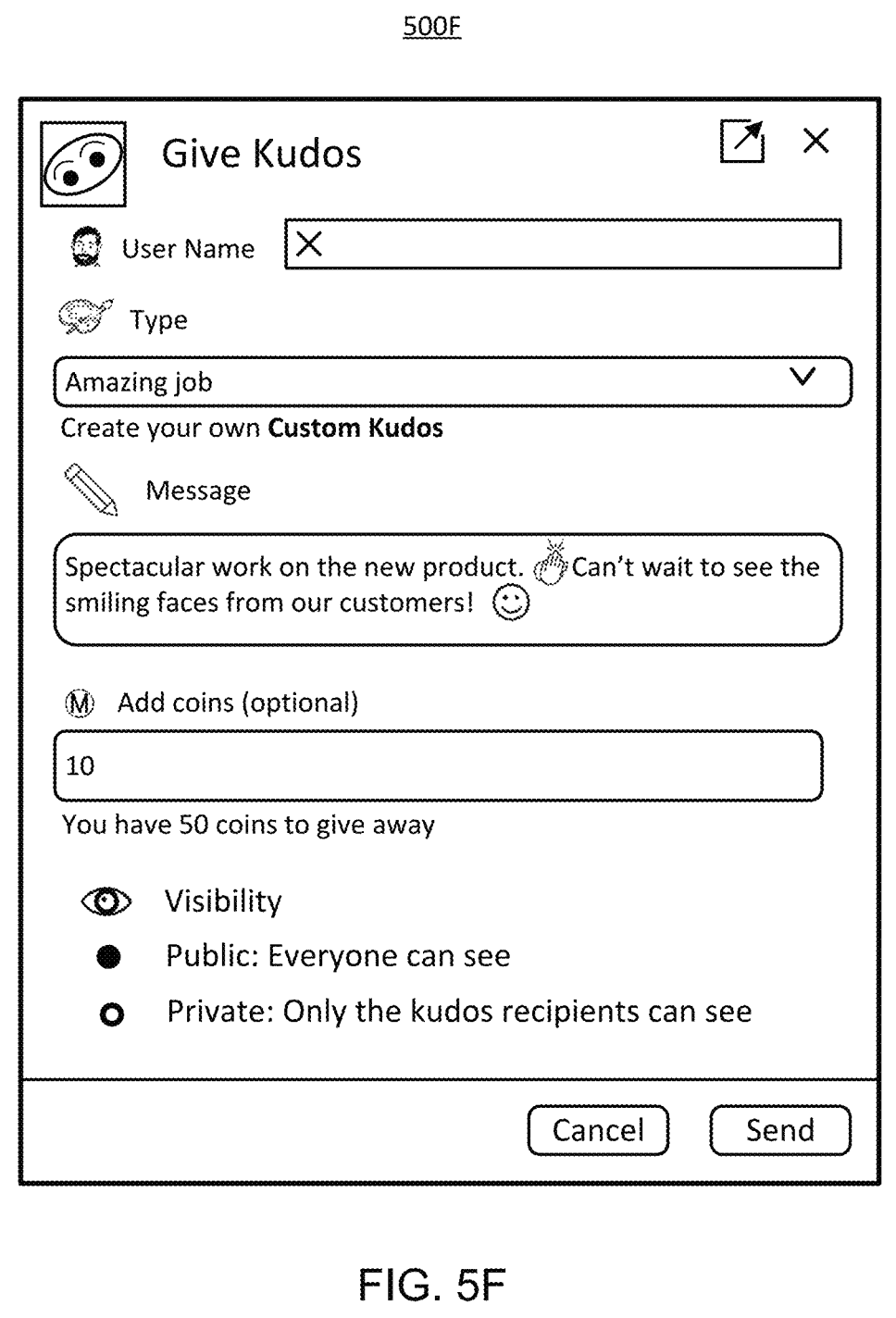

Give Kudos

User Name   ✕

Type

Amazing job    ⌄

Create your own Custom Kudos

Message

Spectacular work on the new product. 👏 Can't wait to see the smiling faces from our customers! ☺

Ⓜ  Add coins (optional)

10

You have 50 coins to give away

👁  Visibility

●  Public: Everyone can see

○  Private: Only the kudos recipients can see

Cancel    Send

Figure 5J:
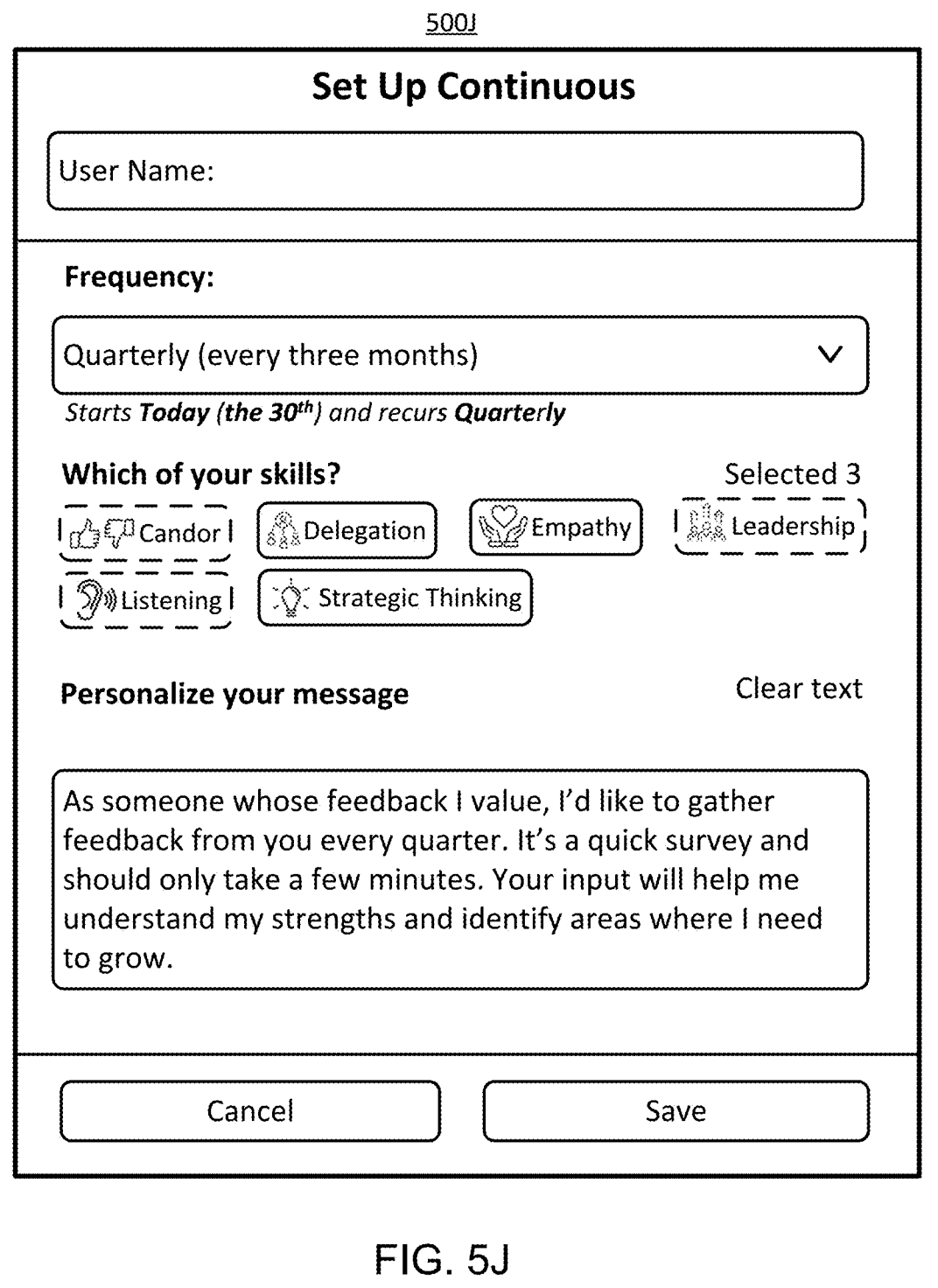

Set Up Continuous

User Name:

Frequency:

Quarterly (every three months)     ⌄

*Starts Today (the 30th) and recurs Quarterly*

Which of your skills?                              Selected 3

👍💬 Candor        🧍Delegation        💚 Empathy        👥 Leadership

👂))Listening        💡 Strategic Thinking

Personalize your message                              Clear text

As someone whose feedback I value, I'd like to gather feedback from you every quarter. It's a quick survey and should only take a few minutes. Your input will help me understand my strengths and identify areas where I need to grow.

Cancel        Save

← Back

Channel Settings

General

Kudos

Members

Feedback Friday

Rewards

Billing

Feedback Friday

Disable

Frequency & Day
Send a feedback Friday kickoff, a reminder, and a recap on this day

| Weekly (recommended) ⌄ | Friday ⌄ |

Occurs once every Week on Fridays

Monday

Tuesday

Wednesday

Thursday

Kickoff
Will be sent at 10:00 am, -02

Your Message:

Reset to default

Happy Feedback Friday!
Your mission: Give the gift of feedback and make your

| Close | Save |

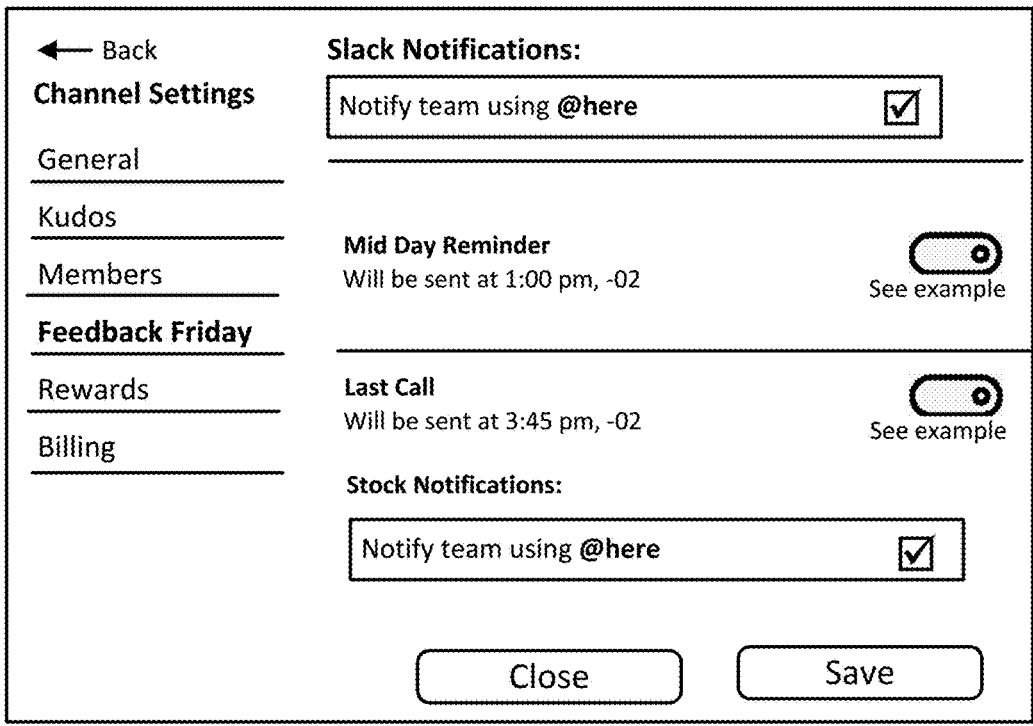

← Back

Channel Settings

General

Kudos

Members

Feedback Friday

Rewards

Billing

Slack Notifications:

| Notify team using @here | ☑ |

Mid Day Reminder
Will be sent at 1:00 pm, -02

See example

Last Call
Will be sent at 3:45 pm, -02

See example

Stock Notifications:

| Notify team using @here | ☑ |

| Close | Save |

Figure 5M:
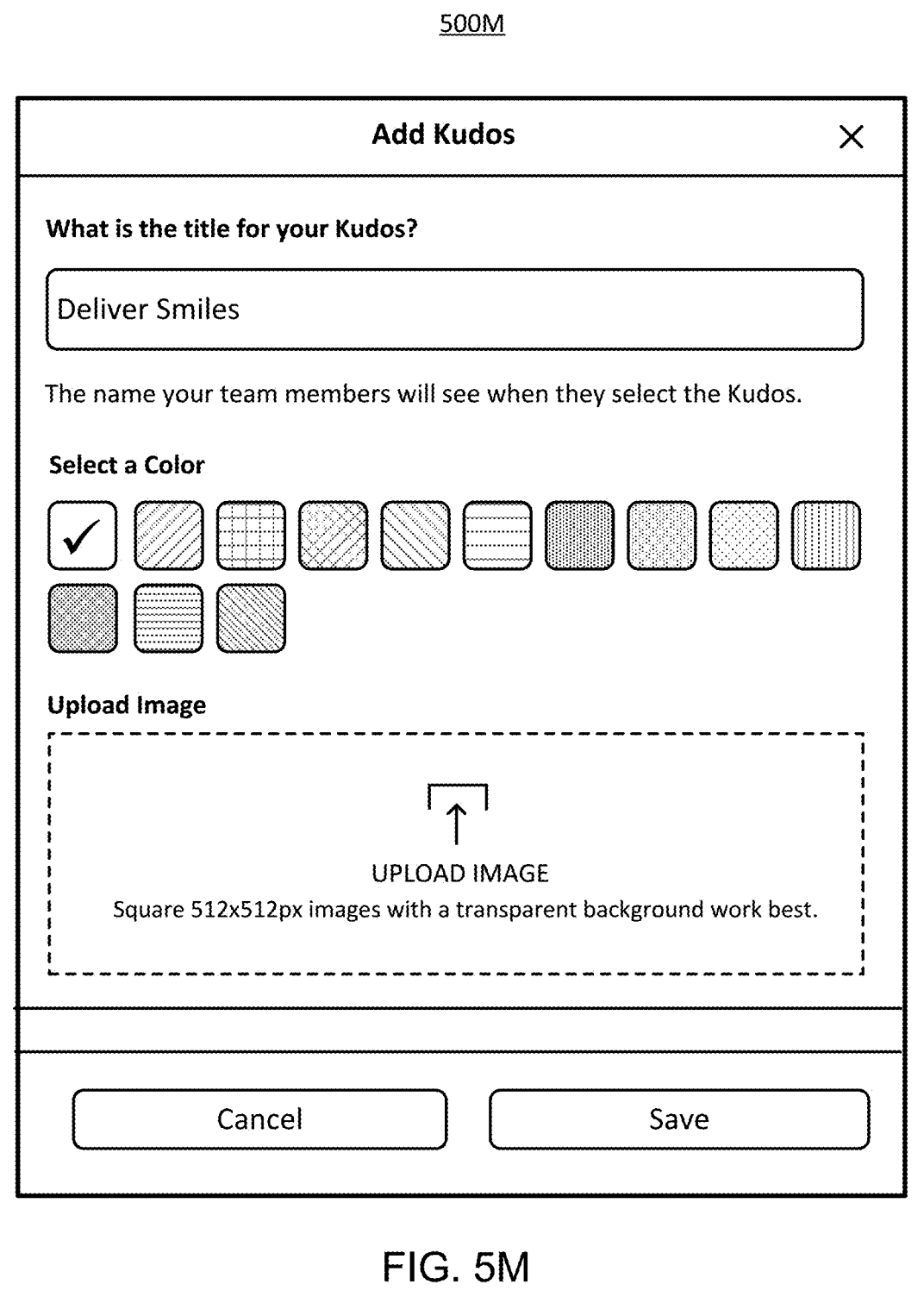

Add Kudos    ✕

What is the title for your Kudos?

Deliver Smiles

The name your team members will see when they select the Kudos.

Select a Color

✓

Upload Image

↑

UPLOAD IMAGE

Square 512x512px images with a transparent background work best.

Cancel    Save

500Q
MatterBot [APP] 1:20 PM
Sam Lepak gave kudos to @Brett
Kudos (24kB)
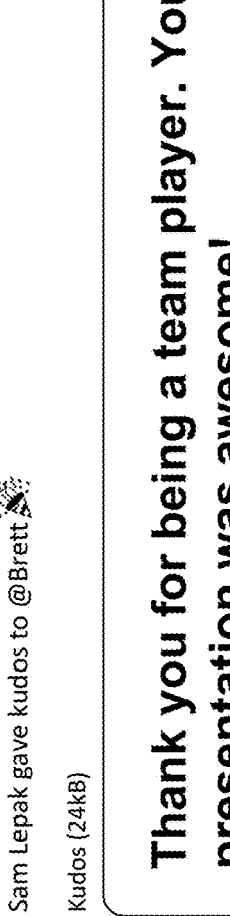
Thank you for being a team player. Your presentation was awesome!
THANK YOU
Ⓜ 25 coins
Give Kudos    ( ••• )
 1 reply Today at 10:59 AM
FIG. 5Q

500S

500T

500U

Hoozah! Flawless execution on last week's launch. I can always count on you.

TEAM PLAYER

Figure 5V:
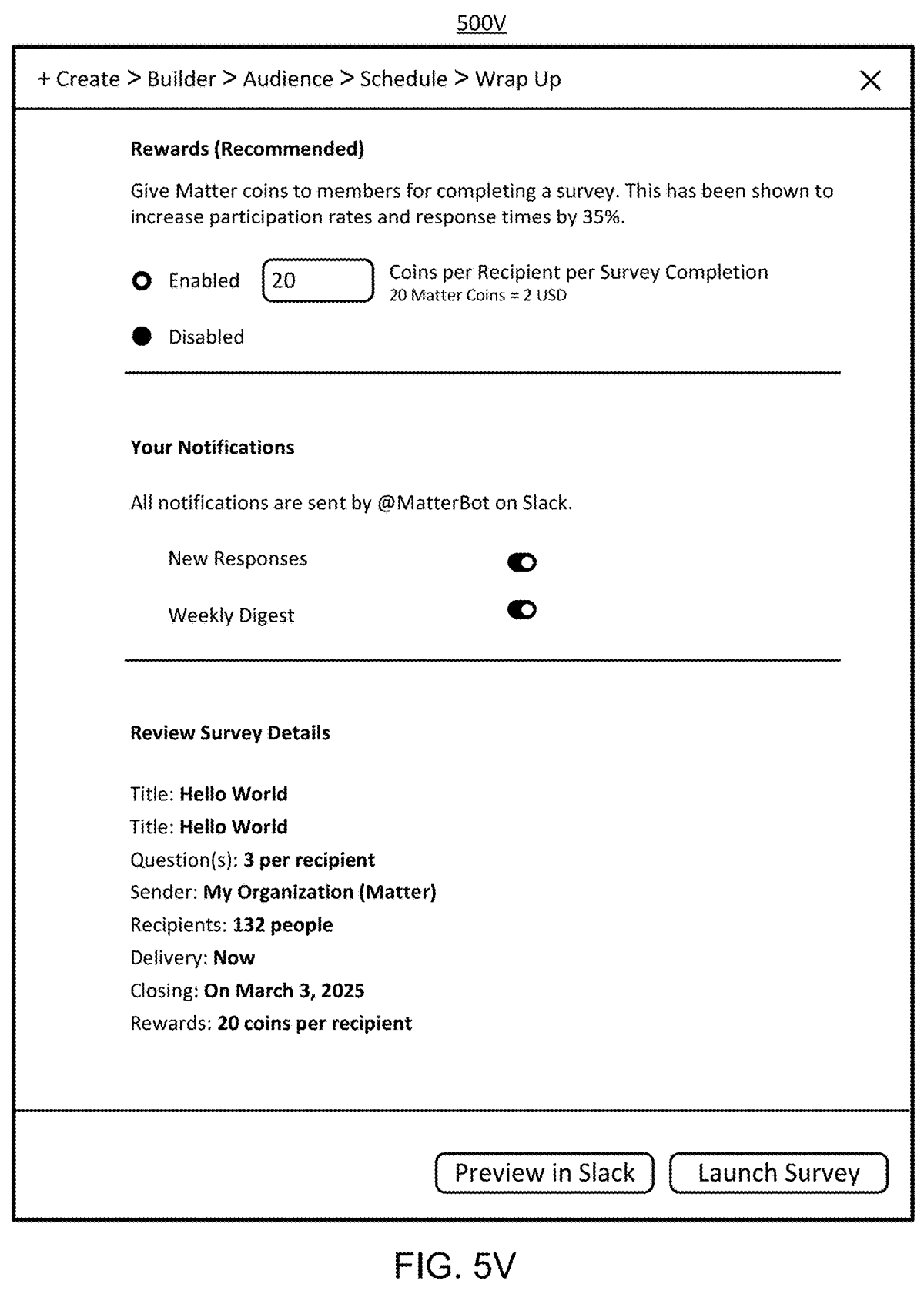

500V

+ Create > Builder > Audience > Schedule > Wrap Up                    ✕

Rewards (Recommended)

Give Matter coins to members for completing a survey. This has been shown to increase participation rates and response times by 35%.

○ Enabled    [20]    Coins per Recipient per Survey Completion
                      20 Matter Coins = 2 USD ● Disabled

---

Your Notifications

All notifications are sent by @MatterBot on Slack.

New Responses                    ⬤

Weekly Digest                    ⬤

---

Review Survey Details

Title: Hello World
Title: Hello World
Question(s): 3 per recipient
Sender: My Organization (Matter)
Recipients: 132 people
Delivery: Now
Closing: On March 3, 2025
Rewards: 20 coins per recipient

[ Preview in Slack ]    [ Launch Survey ]

Today ⌄

◈ Only visible to you

MatterBot [APP] 10:00 AM

Hey @avery! 👋
We launched our new Pulse Survey and are asking you to take a minute to complete it.

*What's a Pulse Survey?*
Pulse surveys are an opportunity for you to share your voice in the workplace. Surveys will ask about personal growth, work environment, the organization's values, and much more.

Surveys are 100% anonymous unless you type in your name.

Ⓜ Coin Reward Ⓜ
You'll receive 20 Matter coins for completing this survey.

From: Brett Hellman
Anonymous Survey: All answers are shared anonymously.

[ Start Survey ]

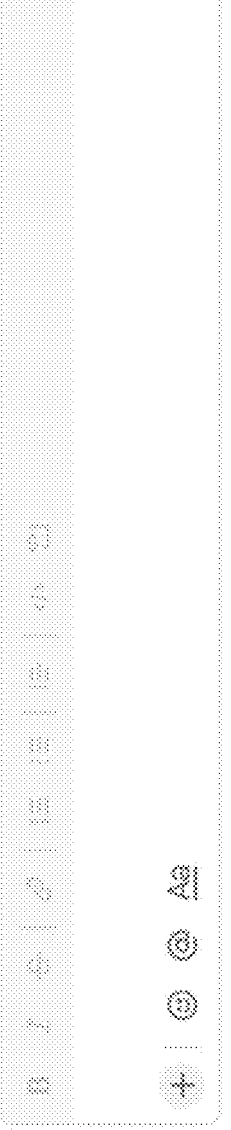

FIG. 5W

ONLINE FEEDBACK SYSTEM

CROSS-REFERENCE TO RELATED APPLICATIONS

This application is a continuation-in-part of U.S. patent application Ser. No. 17/965,513, "Online Feedback System," filed on Oct. 13, 2022, which claims priority under 35 U.S.C. § 119(e) to U.S. Provisional Patent Application Ser. No. 63/256,119, "Feedback Friday and the Matter System," filed on Oct. 15, 2021. The subject matter of all of the foregoing is incorporated herein by reference in their entirety.

FIELD

The disclosed embodiments relate generally to an online messaging system, and more specifically to an online feedback system that reminds users to send feedback messages to other users in a same channel based on messages send to and from the users of the channel.

BACKGROUND

In collaborative environments, regular feedback and recognition are essential for promoting engagement, motivation, and productivity among team members. Traditionally, feedback is exchanged informally, often lacking structure, consistency, and clear incentives for active participation. This lack of organized feedback can hinder the recognition of contributions, reduce motivation, and limit insights into team dynamics.

Existing systems provide limited mechanisms for tracking feedback exchanges, recognizing contributions, or incentivizing participation. Furthermore, they often lack features for quantitatively analyzing feedback activity, making it difficult for organizations to assess engagement levels or identify areas for improvement.

In addition to feedback, survey-based assessments play a critical role in gathering insights from users, whether for gauging satisfaction, collecting feedback on specific initiatives, or conducting general assessments. However, conventional survey tools may not offer seamless integration with incentive systems, which can reduce response rates and engagement.

SUMMARY

To address the above-described problems, systems described herein facilitate structured feedback exchanges among users and offer tools to enhance engagement through formalized feedback channels. Incentives, such as virtual currency, can further encourage participation and create a rewarding experience. Further, the systems described herein also faciliate effective survey administration within a collaborative channel to enable users to not only participate easily but also receive rewards that encourage higher completion rates and more insightful responses.

Embodiments described herein include a method or a system for facilitating feedback exchange among users. The system tracks messages exchanged among users in the channel and, based on this tracking, generates and displays a reminder for a first user to send feedback to a second user. The system further displays the first user's total virtual currency balance, receives a text entry and an amount of virtual currency from the first user for the second user, and generates a feedback message based on the text entry. The feedback message, accompanied by the specified amount of virtual currency, is then sent to the second user, and the virtual currency is transferred from the first user's virtual bank account to the second user's virtual bank account. The system also calculates statistics related to feedback exchanges within the channel and generating a summary message displaying these statistics, thereby enhancing engagement and recognition among users in the channel.

In some embodiments, the system also facilitates administration of surveys. The system generates a survey creation interface, allowing a user to specify survey parameters such as anonymity settings, recipient selection, and a reward setting specifying virtual currency available for survey completion. Upon receiving user-defined survey parameters, the system sends a message to each selected recipient within the channel, inviting participation and indicating the virtual currency reward. Survey responses from each recipient are received, recorded and used to update each respondent's virtual currency account to reflect the awarded currency. The method further includes computing statistics associated with the survey results and generating a summary message displaying these statistics within the channel, providing insights into survey engagement and responses patterns.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 4 illustrates a flowchart of an example method for implementing a computer-based channel for messaging feedback among users of the channel, in accordance with some embodiments.

FIG. 5F shows a GUI that allows a message-sending user to enter a recipient user's name, and enter a text entry to customize the feedback template when generating a feedback message, in accordance with some embodiments.

FIG. 5J illustrates a GUI that allows a user to set up a continuous feedback request, in accordance with some embodiments.

FIGS. 5K-5L illustrate GUIs configured to allow an admin user to set a feedback program for an organization, in accordance with some embodiments.

FIG. 5M illustrates a GUI configured to allow a user (or any user who is given a permission to modify templates) to create a feedback template (e.g., kudos template), in accordance with some embodiments.

FIG. 5O illustrates an example GUI that enables users to add virtual currency to a kudos message, or share the kudos message on another platform, in accordance with some embodiments.

FIGS. 5P-1 and 5P-2 illustrate an example GUI that provides users with options to add virtual currency to a message, in accordance with some embodiments.

FIG. 5Q illustrates an example GUI displayed after virtual currency have been added to a kudos message, in accordance with some embodiments.

FIG. 5V illustrates an example GUI for setting up a survey where rewards, notifications, and survey details can be customized, in accordance with some embodiments.

FIG. 5W illustrates an example message sent to invite a user, Avery, to participate in a survey within their workplace, in accordance with some embodiments.

DETAILED DESCRIPTION

Figure 1:
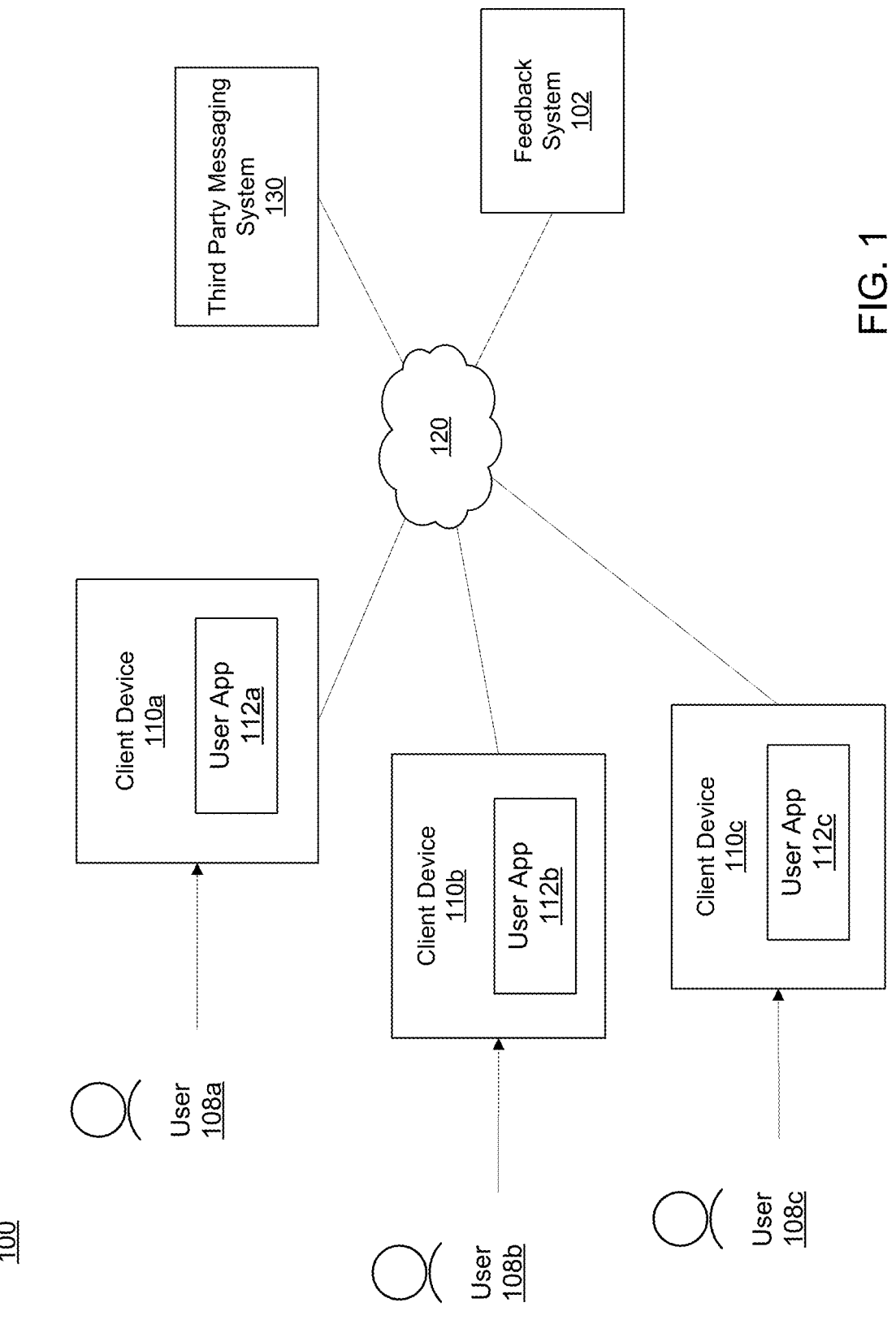
FIG. 1 illustrates a diagram of a system environment of an example computing system, in accordance with some embodiments.

The figures and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Feedback is one of the ways for people to know if they are doing something right or wrong. Many organizations have guidelines about how feedback is handled. Positive feedback and constructive feedback are both very important. Positive feedback can recognize successes and employee contributions. Constructive feedback can prevent or reduce future mistakes. Further, employee voices should be valued, and employee users should be appreciated. A healthy company culture welcomes feedback and uses it to foster the growth of individuals, teams, and the organization.

In some existing work environments, human resources personnel or managers are tasked to remind people to provide feedback to their colleagues. In some cases, repeated emails may be manually sent to everyone regardless of whether the email recipient has already provided feedback to others or not. In some cases, the manager needs to track the people who have already sent feedback to others, and only send reminders to the people who haven't provided feedback to others. Additionally, it is burdensome for people to create a feedback message from scratch. Simple text messages lack aesthetic appeal, while multi-media messages would take too much effort to create.

The principles described herein solve the above-described problem by implementing a system or a method for providing a computer-based channel for messaging feedback among multiple users in the channel. The system tracks messages sent to and from the users of the channel, and generates and displays to a first user of the channel a reminder to send feedback to a second user of the channel based on tracked messages sent to and from the users of the channel. The first user can interact with an interactive element of the reminder. Responsive to the first user activating the interactive element of the reminder, the system suggests and displays a plurality of message templates for the feedback. The first user can then select one of the message templates and enter a text entry for the selected message template. Responsive to receiving from the first user the selection of one of the message templates and the text entry, the system generates a feedback message based on the selected message template and the text entry. The system then sends the feedback message from the first user to the second user.

In some embodiments, the reminder is generated periodically at a preset time. In some embodiments, the reminder is generated automatically by a chatbot of the channel and sent automatically from the chatbot to the first user. In some embodiments, the reminder is a private message that is displayed only to the first user. In some embodiments, the reminder is a public message that is displayed to multiple users of the channel. In some embodiments, the reminder is based on tracked messages sent between the first user and the second user. In some embodiments, the reminder is based on tracked messages sent between multiple users of the channel, including the first user, the second user, and other additional users.

In some embodiments, the users of the channel are members of an organization. The plurality of message templates include message templates relating to (1) the organization's value, (2) an inside joke among users of the channel, or (3) a skill required by the organization of the users of the channel. In some embodiments, the users of the channel are members of an organization, and the plurality of message templates include a title, a background, and an image relating to the organization.

In some embodiments, a template may include a multimedia component, which may be a static image, an animated image, a video, and/or audio. A user can generate their new template by integrating their selected static image, animated image, video, and/or audio into the new template. In some embodiments, at least some of the message templates were created by users of the channel.

In some embodiments, the system also computes statistics associated with feedback messages sent to and from the users of the channel, and generates and displays a message summarizing the statistics. In some embodiments, the statistics include a number of feedback messages sent and received by each user, and the message includes a leaderboard of which users of the channel have sent or received a highest number of feedback messages. In some embodiments, the statistics are computed periodically, and a same user is not listed on the leaderboard for consecutive periods. In some embodiments, the statistics include an overall rating of a particular skill of an individual user based on feedback messages relating to the particular skill sent from different users of the channel to the individual user.

In some embodiments, the system also receives a feedback request from the first user. The request solicits feedback from a second user relating to a particular skill for the first user. The system then displays to the second user a message to send feedback to the first user relating to the particular skill.

In some embodiments, the system also operates a virtual bank configured to manage a virtual currency. Users of the channel have virtual bank accounts for depositing virtual currency. The system may also receive from the first user an indication to include an amount of virtual currency with the feedback message, and send the amount of virtual currency to the second user with the feedback message, and transfer the amount of virtual currency from the first user's virtual bank account to the second user's virtual bank account.

In some embodiments, the system may also receive from an individual user a request to redeem an amount of virtual currency for a reward selected from among a plurality of rewards. Responsive to receiving approval of the request, the system may deduct the amount of virtual currency from the individual user's virtual bank account, and causes the reward to be sent to the user. In some embodiments, the reward includes at least one of (1) a meal with a company executive, (2) a gift card from a vendor, or (3) an amount of cash.

In some embodiments, users can send messages (e.g., give kudos) to each other along with an amount of virtual currency. In some embodiments, other users can add virtual currency to an existing kudo message without needing to generate a separate kudo message themselves.

In some embodiments, the system facilitates administration of surveys. The system provides a survey creation interface that allows a user to specify survey parameters, including an anonymity setting, a recipient selection, a reward setting for survey participation. The reward setting indicates a virtual currency available upon survey completion. In some embodiments, the survey parameters further include a closing date for the survey, after which responses will no longer be accepted.

Responsive to receiving user indication, specifying survey parameters, the system generates and sends a message to each recipient within an option to begin the survey in the channel. The message indicates the virtual currency available upon survey completion. In some embodiments, the message sent to each recipient includes a personalized greeting and a direct call-to-action button to begin the survey. When users complete the survey, they are rewarded with virtual currency that can be redeemed for rewards like gift cards, making the survey experience more enjoyable for users. The system may also compute statistics based on survey results in the channel, and generates and display a message summarizing the computed statistics in the channel. In some embodiments, the computed statistics include a response rate, an average score for a question in the survey, an overall survey completion rate among recipients. In some embodiments, the system provides real-time updates on a number of responses received in the channel. In some embodiments, the statistics associated with the survey results may include sentiment analysis of open-text responses, providing insights into an overall positive or negative feedback trend. In some embodiments, the message summarizing the computed statistics includes a visual representation of the computed statistics. The visual representation includes one or more of a bar chart, a pie chart, a line chart, a heatmap, a scatter plot, a histogram, a box plot, a bubble chart, an area chart, a gantt chart, a radar chart, and/or a waterfall chart.

In some embodiments, the system sends a reminder notification to recipients who have not yet completed the survey after a predetermined period has elapsed since an initial survey message was sent. The notification includes a call-to-action button to begin the survey. In some embodiments, the system further calculate and displays, to the channel, survey engagement metrics including one or more of a number of survey views, partial completions, full completions, in real time.

Example System Environment

FIG. 1 illustrates a diagram of a system environment 100, in which principles described herein may be implemented, in accordance with some embodiments. The system environment 100 shown in FIG. 1 includes one or more client devices 110a, 110b, and 110c (collectively referred to as client devices 110), a network 120, and a feedback system 102. In some embodiments, the system environment 100 further includes a third party messaging system 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users 108a, 108b, 108c (collectively referred to as 108) may be customers of the feedback system 102 or any individuals who access the system of the feedback system 102, such as an online website or a mobile application. In some embodiments, a client device 110 executes a user application 112a, 112b, 112c (collectively referred to as user application 112) that launches a graphical user interface (GUI) for a user 108 of the client device 110 to interact with the feedback system 102. The GUI may be an example of a user interface. The user application 112 may also be a web browser application to enable interactions between the client device 110 and the feedback system 102 via the network 120. In another embodiment, the user interface may take the form of a software application published by the feedback system 102 and installed on the user device 110. In yet another embodiment, a client device 110 interacts with the feedback system 102 through an application programming interface (API) running on a native operating system of the client device 110, such as IOS or ANDROID.

In some embodiments, the user application 112 may be associated with the feedback system 102. In some embodiments, the user application 112 associated with the feedback system 102 may include an add-on associated with the third party messaging system 130. In some embodiments, the user application 112 may be associated with the third party messaging system 130. In some embodiments, the user application 112 associated with the third party messaging system 130 may include an add-on component associated with the feedback system 102.

The network 120 provides connections to the components of the system environment 100 through one or more sub-networks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

In some embodiments, the feedback system 102 or the third party messaging system 130 are servers that host feedback and messaging systems to allow users to use the client devices 110 to send and receive feedback messages. In some embodiments, the feedback system 102 itself includes a messaging system that allows users to send and receive feedback messages from other users.

Example Computing Server Architecture

Figure 2:
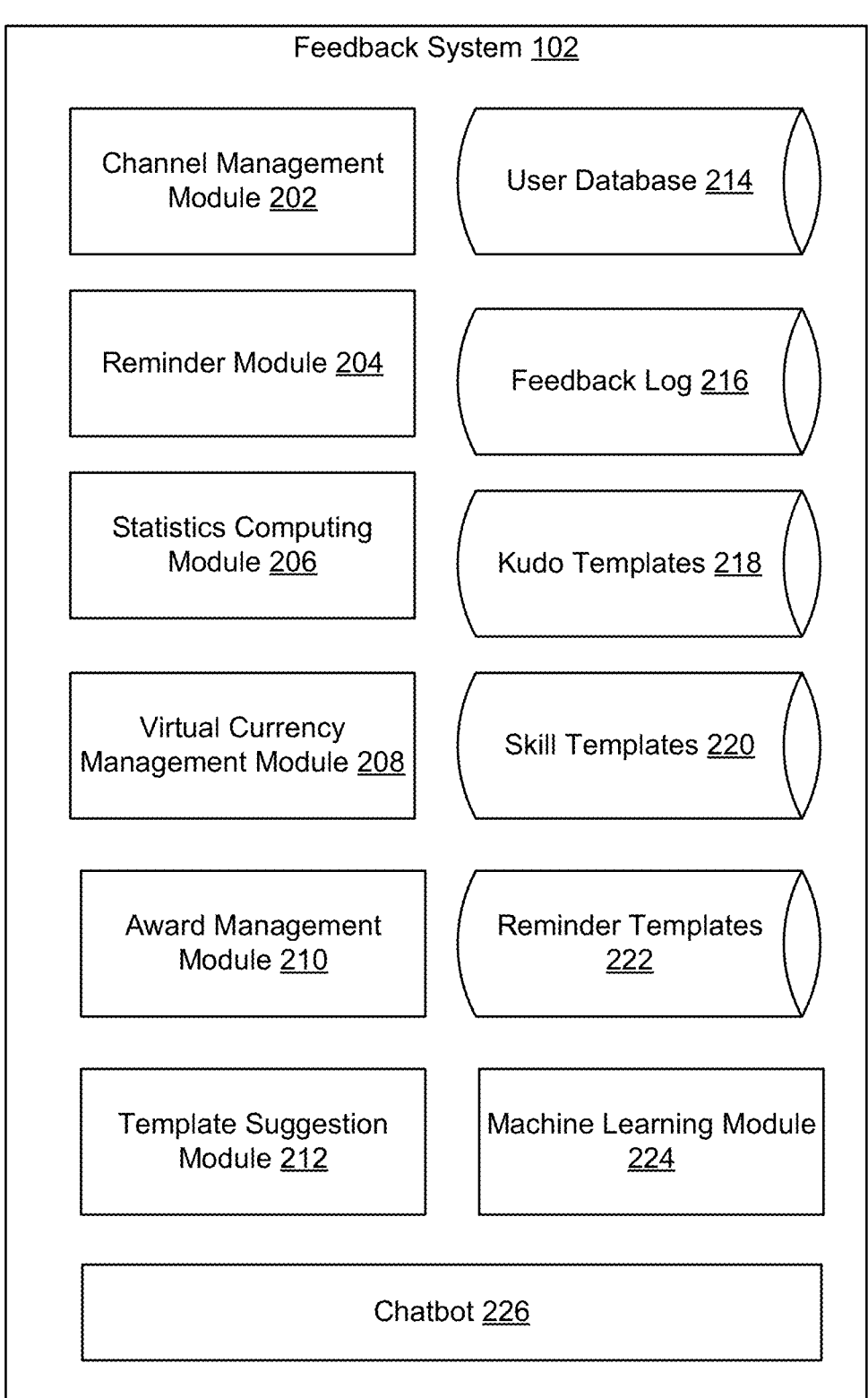
FIG. 2 illustrates an example architecture of messaging system, in accordance with some embodiments.

FIG. 2 illustrates an example architecture of feedback system 102 in accordance with some embodiments. The feedback system 102 includes a channel management module 202, a reminder module 204, a statistics computing module 206, a virtual currency management module 208, an award management module 210 and a template suggestion module 212. The feedback system 102 also includes a user database 214, a feedback log 216, and various message templates, including (but not limited to) feedback message templates (e.g., kudos templates 218 and skill templates 220) and reminder templates 222. The channel management module 202 may be configured to manage one or more channels, each of which includes multiple users. The users in a same channel are able to send or request feedback from each other. The user database 214 stores information associated with users of the channels. The feedback log 216 stores feedback messages sent to and from users of channels.

The statistics computing module 206 may be configured to analyze feedback messages stored in the feedback log 216 to compute statistics associated with a particular user, statistics associated with a particular channel, and/or statistics associated with all the channels. In some embodiments, the statistics computing module 206 is also configured to generate leaderboard messages based on the computed statistics. The reminder module 204 may be configured to schedule and generate reminders for users in different channels. In some embodiments, the reminder module 204 is also configured to use statistics computed by the statistics computing module 206 to generate reminders.

In some embodiments, the feedback system 102 further includes a virtual currency management module 208 and/or an award management module 210. The virtual currency management module 208 operates as a virtual bank that maintains virtual currency accounts for users. A first user can give a second user a number of virtual currency via a feedback message. When users exchange virtual currency, the virtual currency management module 208 updates both users' virtual currency accounts, such as deducting the number of virtual currency from the first user's virtual currency account, and adding the number of virtual currency to the second user's virtual currency account. In some embodiments, the virtual currency may be redeemed into real awards, such as a meal with an executive of an organization, a gift card from a vendor, cash, etc. The award management module 340 may be configured to allow users to redeem the virtual currency into one or more real awards.

In some embodiments, the feedback system 102 further includes a template suggestion module 212 and/or a machine learning module 224. The template suggestion module 212 may be configured to suggest different feedback templates, such as a kudos template 218, a skill template 220, or a reminder template 222 to different users. The machine learning module 224 may be configured to process the feedback messages stored in the feedback log 216 to identify patterns. In some embodiments, the statistics computing module 206 and the machine learning module 224 are integrated together as a single module configured to analyze feedback messages stored in the feedback log 216 to compute statistics and extract patterns. In some embodiments, the template suggestion module 212 may be configured to use some of the statistics and extracted patterns to suggest users one or more feedback templates. In some embodiments, the reminder module 204 may be configured to use some of the statistics and extracted patterns to suggest or generate reminders to users.

As briefly discussed above, there are multiple users in each channel, and the users in a same channel are allowed to send, receive, and/or request feedback from each other. In general, in each channel, there is at least one admin user among the multiple users that is given authority to manage various functions of the channel. For example, the admin user may be able to add or delete users from the channel, generate various feedback templates (such as kudos templates 218, skill templates 220, and reminder templates 222), set reminders, enable/disable virtual currency and/or award features, set awards, approve coin redemption request, etc. In some embodiments, the admin user may also be able to give other users additional permissions to manage certain functions of the channel. For example, initially, an admin user may be an IT administrator of an organization, and the admin user may give another user (e.g., an accountant of an organization) a permission to manage functions related to virtual currency and awards. As another example, the admin user may give another user (e.g., an human resource personnel) a permission to manage functions related to user management, such as adding or removing users in the channel. The admin user may also give every user or a subset of users a permission to add new feedback templates and/or edit existing feedback templates.

In some embodiments, the feedback system 102 also includes a chatbot 226 configured to generate personalized messages and/or group messages. For example, the chatbot 226 may be configured to generate individualized reminders to each user in the channel based on their past activities. As another example, the chatbot 226 may also be configured to generate wrap up messages at an end of a cycle to summarize the statistics of the users in the channel. In some embodiments, the messages generated by the chatbot 226 may be sent on behalf of another user, such as an admin user. In some embodiments, the chatbot 226 acts like a mailman, passing messages between users.

In some embodiments, some of the modules in the feedback system 102 may be provided by a third party entity or a separate computing service. For example, the virtual currency management module 208 and award management module 210 may be provided by a third party computing service that offers an application programming interface, allowing the feedback system 102 to connect its own functions to the third party computing service.

Example Architecture of User Application

As discussed above with respect to FIG. 1, users of the feedback system 102 may use client devices 110 to access the functions provided by the feedback system 102. In particular, the client devices 110 may have a user application 112 installed thereon that serves as a user agent for the feedback system 102 and/or the third party messaging system 130. In some embodiments, regular users and admin users are provided same applications with different permissions. Alternatively, regular users and admin users are provided different applications customized for their own use cases.

Figure 3:
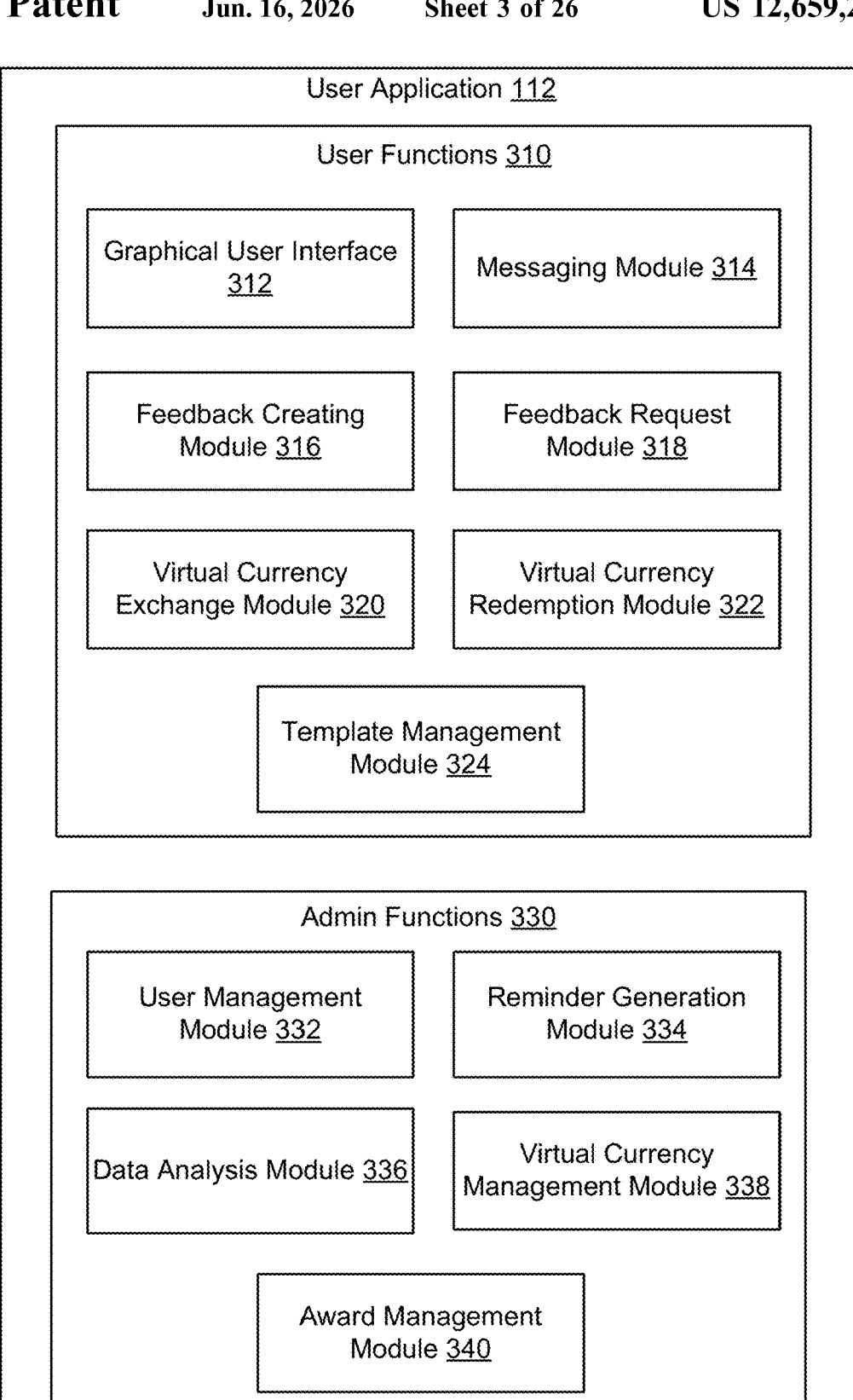
FIG. 3 illustrates an example architecture of a user application, in accordance with some embodiments.

FIG. 3 illustrates an example architecture of a user application 112 in accordance with some embodiments. The user application 112 includes some modules for user functions 310 and some modules for administrative functions 330. The user functions 310 are the functions that enable regular users to generate and receive feedback messages. The administrative functions 330 are the functions that enable admin users to configure or set up the channel. In some embodiments, the administrative functions 330 are only enabled for admin users. In some embodiments, an initial admin user may give certain users permission to access certain or all of the administrative functions 330

The user functions 310 may include a graphical user interface (GUI) 312, a messaging module 314, a feedback creating module 316, a feedback request module 318, a virtual currency exchange module 320, and a virtual currency redemption module 322. In some embodiments, the GUI 312 may be provided by a third party messaging system 130. Alternatively, the GUI 312 may be native to the feedback system 102. The GUI 312 may display feedback messages sent and received by users. The GUI 312 may also display reminders and/or leaderboard messages to users in the channel. The GUI 312 may also display one or more interactive elements that allow users to easily generate multi-media feedback messages to other users, attach virtual currency to feedback messages, and redeem coins into awards.

The feedback creating module 316 may be configured to cause an interactive element associated with feedback creation to be displayed in the GUI 312, such as an icon, a button, a list of feedback templates, etc., allowing a user to conveniently create a feedback message. In some embodiments, the user can select one of the feedback templates, and enter a text entry. The feedback creating module 316 then generates a feedback message based on the user selection of the feedback template and the text entry. In some embodiments, each feedback template includes a title, a background, and an image. The title, background, and/or the image may be associated with (1) a company value, (2) an inside joke, or (3) a skill required by at least one user of the plurality of users.

The feedback request module 318 may be configured to cause an interactive element associated with feedback request to be displayed in the GUI 312, such as an icon, a button, a list of feedback request templates, etc., allowing a first user to conveniently request a feedback from a second user. The feedback requesting module 318 then generates a feedback request message based on the user interaction with the interactive element in the GUI 312.

The messaging module 314 may be configured to cause messages (such as feedback messages created by the feedback creating module 316, and feedback request messages created by feedback request module 318) to be transmitted to target users. In some embodiments, the messaging module 314 may be configured to transmit the messages to the third party messaging system 130 and/or feedback system 102, which in turn transmits the feedback messages to the user applications of the target receivers. On the other side, the messaging module 314 of client devices 110 of the target receivers may be configured to receive messages (sent by other users in the channel) from the third party messaging system 130 and/or feedback system 102, and causes the messages to be displayed in the GUI 312 of the client devices 110.

In some embodiments, the user functions 310 may also include a template management module 324. The template management module 324 may cause an interactive element to be displayed in the GUI 312, and the user may be able to interact with the interactive element to create a new template, and/or remove or modify an existing template. In some embodiments, each template includes a title, a background, and an image. The admin user or any user (who is given permission) may be able to enter a title, select a background color or a background image, and select a foreground image to generate a template.

The virtual currency exchange module 320 may be configured to cause a total amount of virtual currency and an interactive element associated with virtual currency to be displayed in the GUI 312. Users may interact with the interactive element to send virtual currency to other users in the channel. The virtual currency redemption module 322 may be configured to cause a list of rewards to be displayed in the GUI 312. Users may interact with the interactive element to redeem a number of virtual currency into one or more of the rewards.

The administrative functions 330 may include (but are not limited to) a user management module 332, a reminder generation module 334, a data analysis module 336, a virtual currency management module 338, and an award management module 340. The user management module 332 may cause the GUI 312 to display information related to all the users or a subset of users in the channel. The GUI 312 may also display one or more interactive elements that allow the admin user to easily manage users in the channel and/or set various features associated with the channel.

The user management module 332 may cause an interactive element to be displayed in the GUI 312, and the admin user may interact with the interactive element to manage users, such as add a new user to the channel, remove an existing user from the channel, authorize additional permission to a particular user, remove a permission of a particular user.

The reminder generation module 334 may cause an interactive element to be displayed in the GUI 312, and the admin user may interact with the interactive element to set reminders. In some embodiments, the reminder generation module 334 may display a list of reminder templates to the admin user, and the admin user may select one of the reminder template, and enter textual content into the template to create a reminder message. The admin user may also interact with the interactive element to set a frequency for sending the reminder message, and/or set a user criterion that, when satisfied, reminder messages will be sent to the users of the channel. For example, the user criterion may be the users who have not sent any feedback message in a predetermined time period, such as 3 days, 5 days, a month, etc. The sender of the messages may be set as a chatbot or any user of the channel, such as an admin user, or a human resource manager.

The data analysis module 336 may be configured to analyze and compute statistics based on messages sent to and received among users in the channel. The data analysis module 336 may also cause the statistics to be presented to the admin user in the GUI 312. The data analysis module 336 may also display an interactive element in the GUI 312, and the admin user may interact with the interactive element to cause different types of statistics to be computed and/or presented in different formats in the GUI 312.

The data analysis module 336 may also generate a wrap-up message based on the computed statistics. The wrap-up message is then sent, by the messaging module 314 as a group message or public message to the users in the channel. In some embodiments, the wrap-up message is sent by any user in the channel, such as the admin user, a group manager. In some embodiments, the wrap-up message is sent by a chatbot of the feedback system 102. The generation of the wrap-up message may be set by the admin user. For example, a wrap-up message may be set to be generated at a predetermined frequency, such as (but not limited to) every Friday. The wrap up message may be set to include a leaderboard message presenting one or more users that received or sent a highest number of messages. In some embodiments, a same user is not presented on the leaderboard for consecutive times. For example, when the same user sent a highest number of feedback messages in consecutive time periods, the leaderboard message is configured to present a different user that sent a second highest number of messages in a current time period. Alternatively, each user is assigned a weight, a person who was listed on the previous leaderboard is given a lower weight, and a new member of the channel is given a higher weight, etc.

The virtual currency management module 338 may cause the GUI 312 to show a virtual currency account balance of each or a subset of users in the channel. The virtual currency management module 338 may also allow the admin user to deposit additional virtual currency to each of the users or a subset of users in the channel. For example, when an average balance of users' virtual currency accounts in the channel is below a threshold, the virtual currency management module 338 may deposit a preset number of virtual currency to each user in the channel.

The award management module 340 allows the admin user to manage features related to awards. In some embodiments, the award management module 340 receives and presents redemption requests in the GUI 312, where each redemption request is generated by a user in the channel when the user tries to redeem a number of virtual currency with one or more rewards. The admin user can approve or reject the redemption request by interacting with the presented request in the GUI 312. In some embodiments, the admin user may also add new award or remove an existing reward via the reward management module 340.

Example Method for Providing a Computer-Based Channel for Messaging Feedback

FIG. 4 is a flowchart of a method 400 for implementing a computer-based channel for messaging feedback among multiple users in the channel, in accordance with some embodiments. The method may be performed by a computing service or a computing system, such as feedback system 102. The computing system tracks 405 messages sent to and from the users of the channel, and generates and displays 410 to a first user of the channel a reminder to send feedback to a second user of the channel based on tracked messages sent to and from the users of the channel. The first user can then activate an interactive element of the reminder. Responsive to receiving 415 the first user activating the interactive element of the reminder, the system suggests and displays 420 a plurality of message templates for the feedback. The first user can then select one of the message templates and enter a text entry for the selected message template. Responsive to receiving 425 from the first user the selection of one of the message templates and the text entry, the system generates 430 a feedback message based on the selected message template and the text entry. The system sends 435 the feedback message from the first user to the second user.

Example GUIs

Figure 5A:
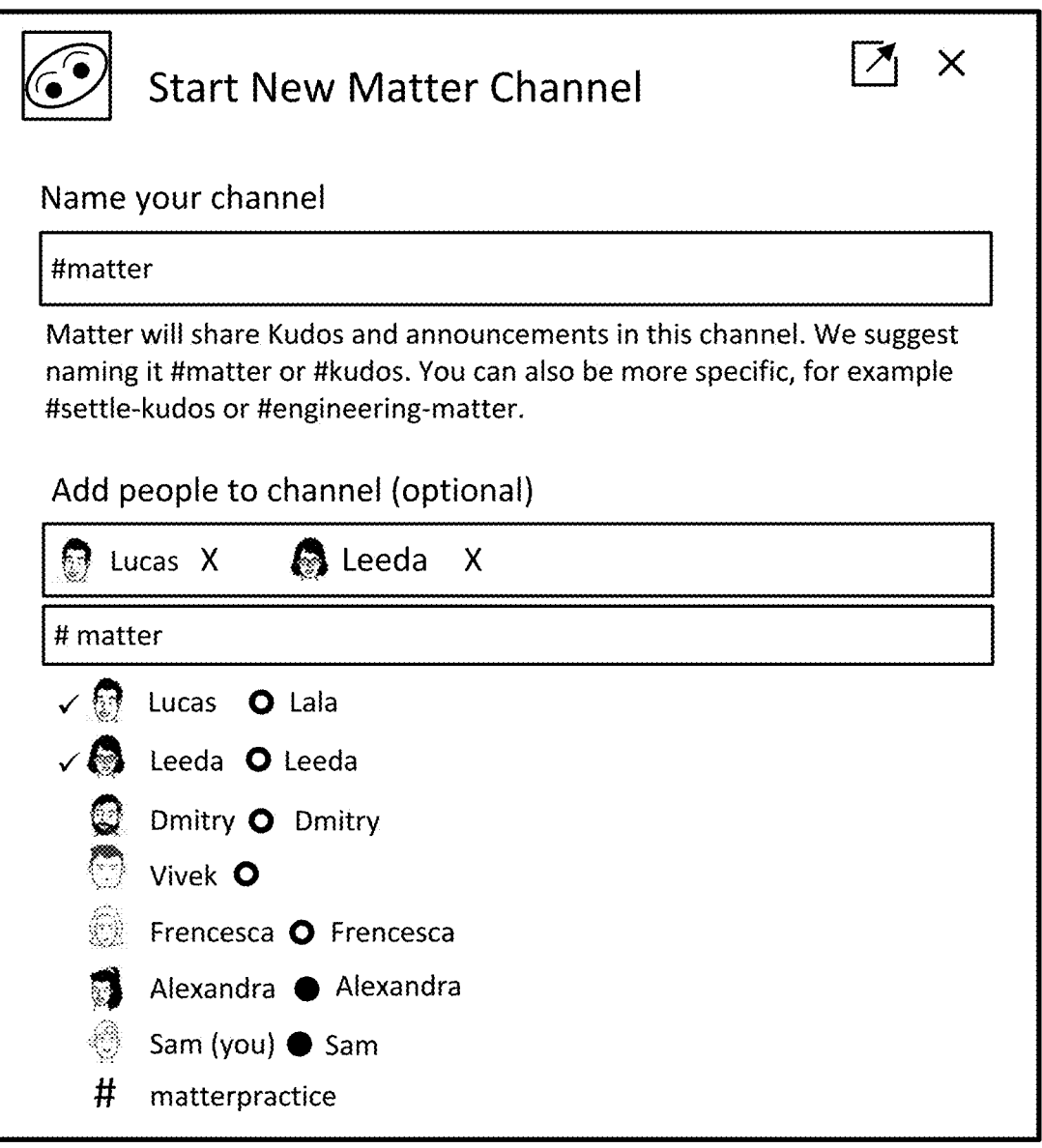
FIG. 5A illustrates an example GUI for creating a new feedback messaging channel, in accordance with some embodiments.
Figure 5B:
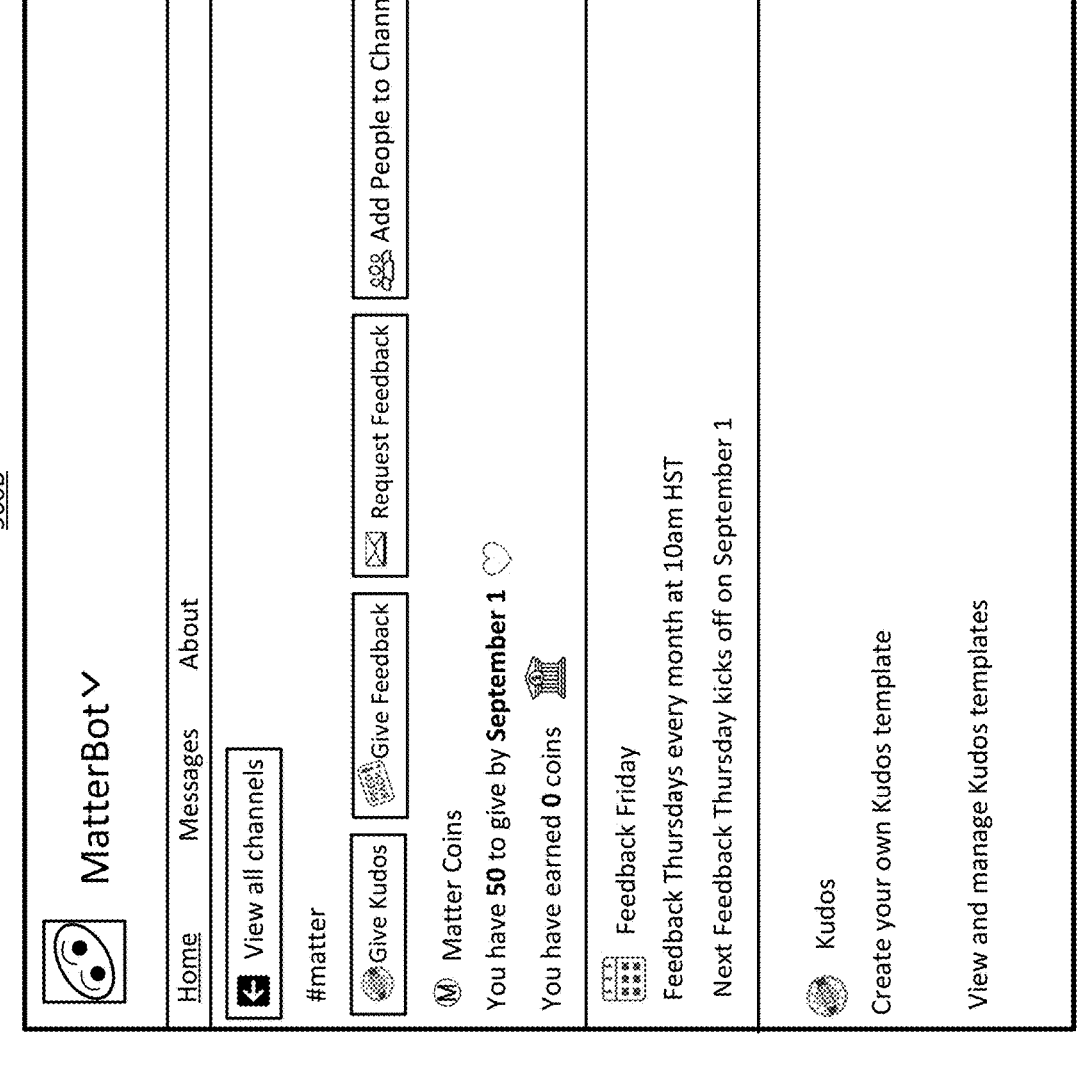
FIG. 5B illustrates an example home page of a user in a feedback messaging channel, in accordance with some embodiments.
Figure 5C:
FIG. 5C illustrates a GUI that presents feedback messages received by a user, in accordance with some embodiments.
Figure 5D:
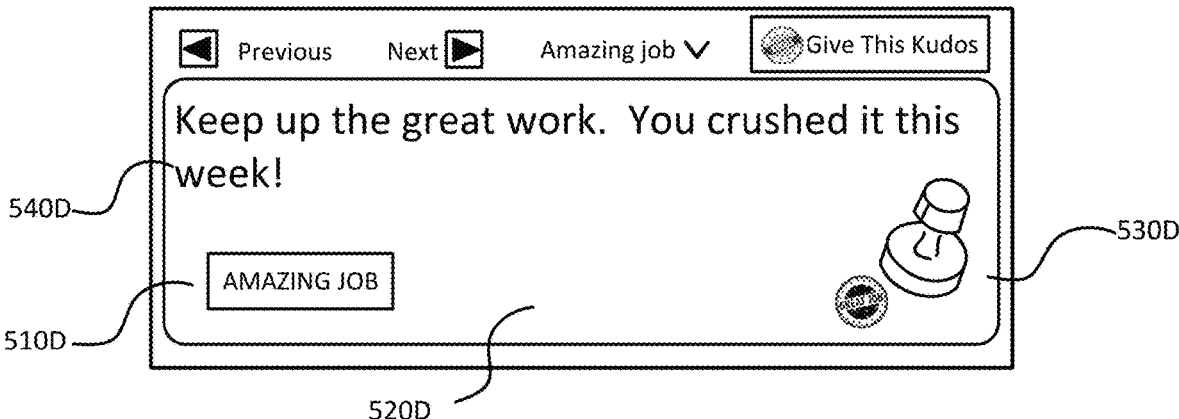
FIG. 5D illustrates a GUI that allows a user to preview a feedback template (e.g., kudos templates), in accordance with some embodiments.
Figure 5E:
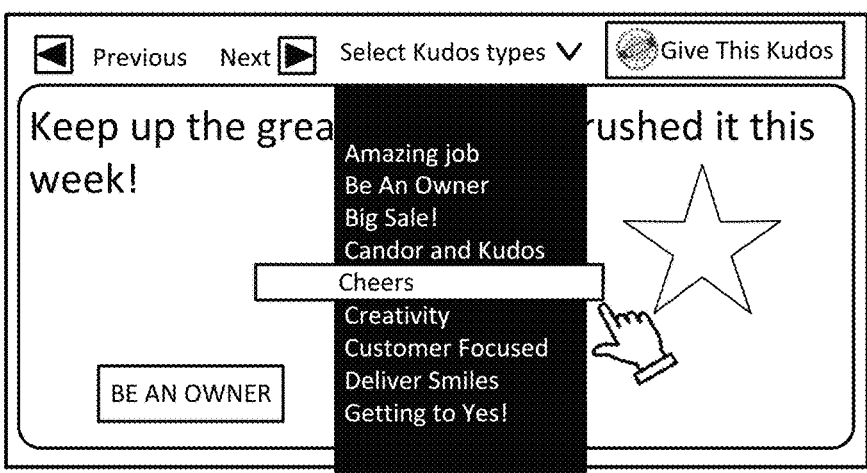
FIG. 5E shows a GUI that presents a list of feedback templates, in accordance with some embodiments.
Figure 5G:
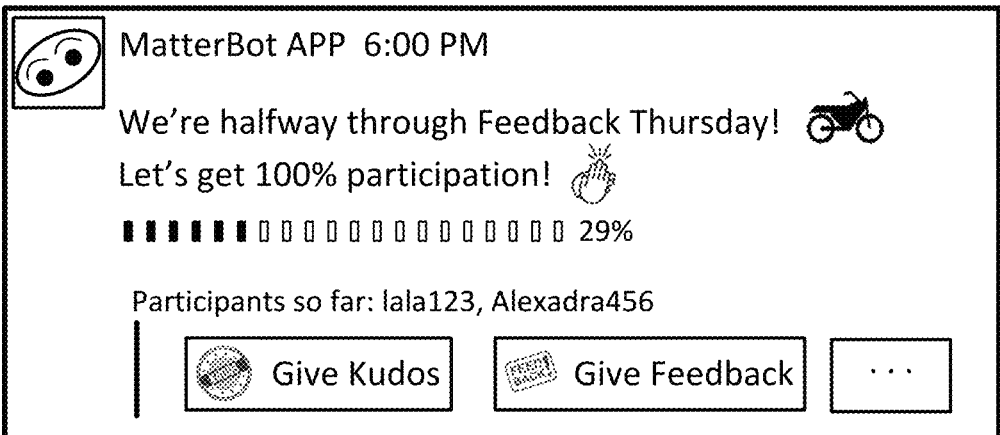
FIGS. 5G-5H illustrate GUIs that present reminders for reminding users in the channel to send out feedback messages, in accordance with some embodiments.
Figure 5H:
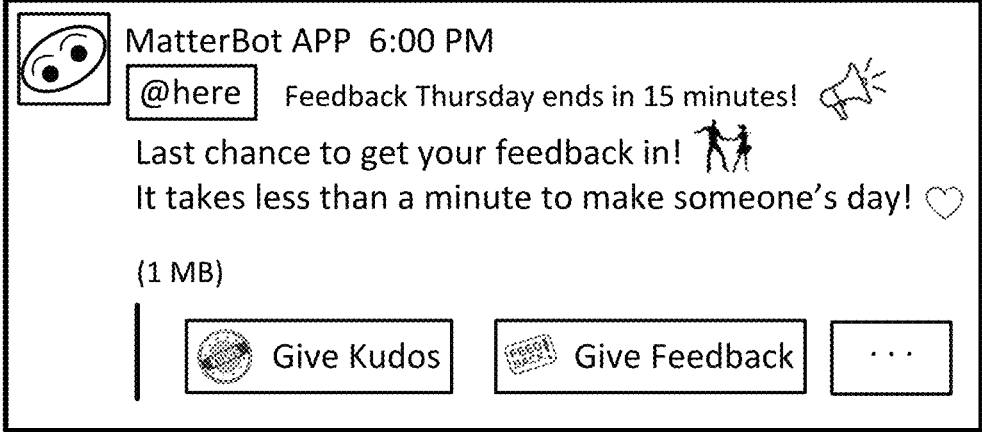
Figure 5I:
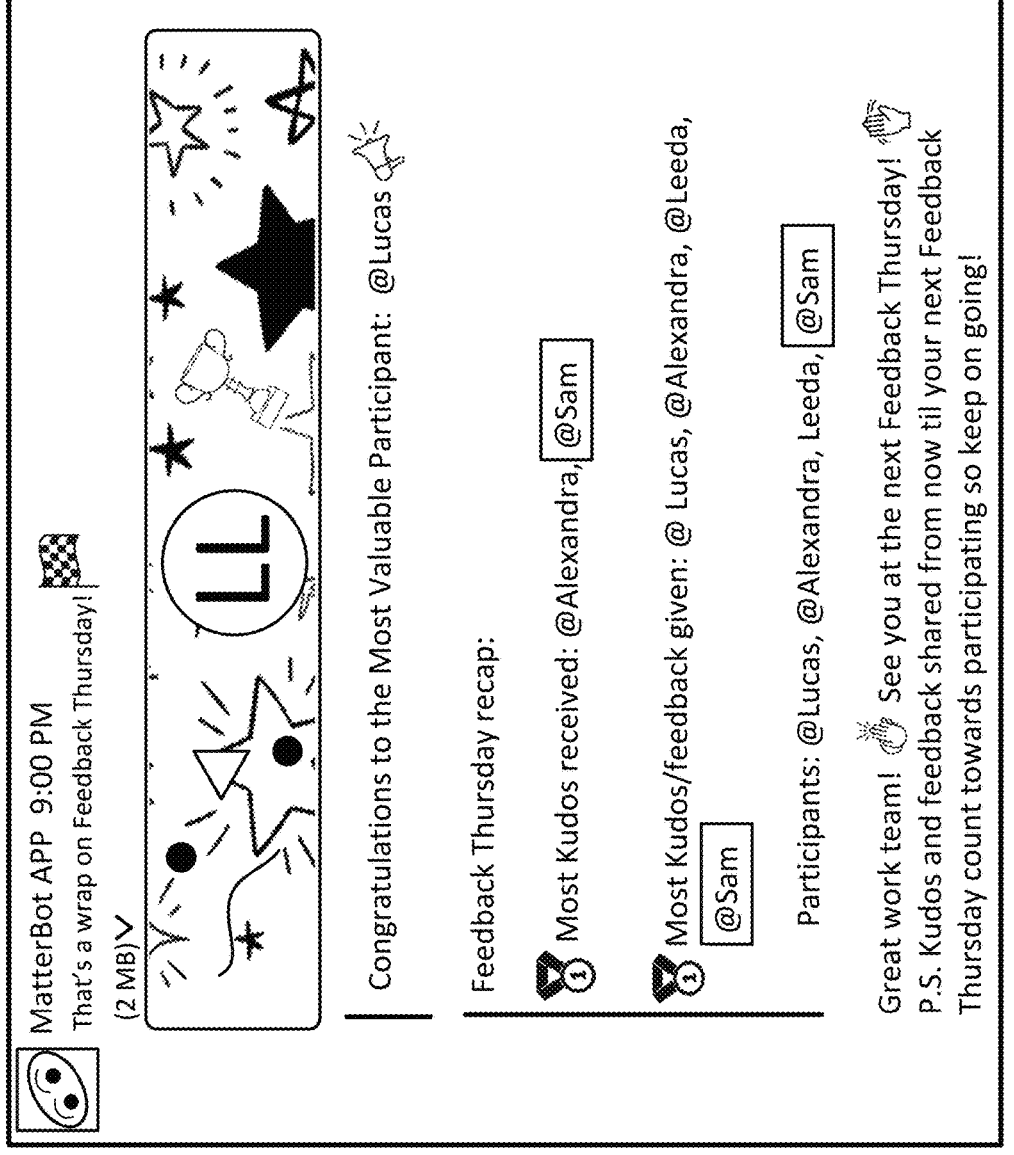
FIG. 5I illustrates a GUI that presents a wrap up message that summarizes statistics associated with feedback messages sent to and from users of a channel, in accordance with some embodiments.
Figure 5N:
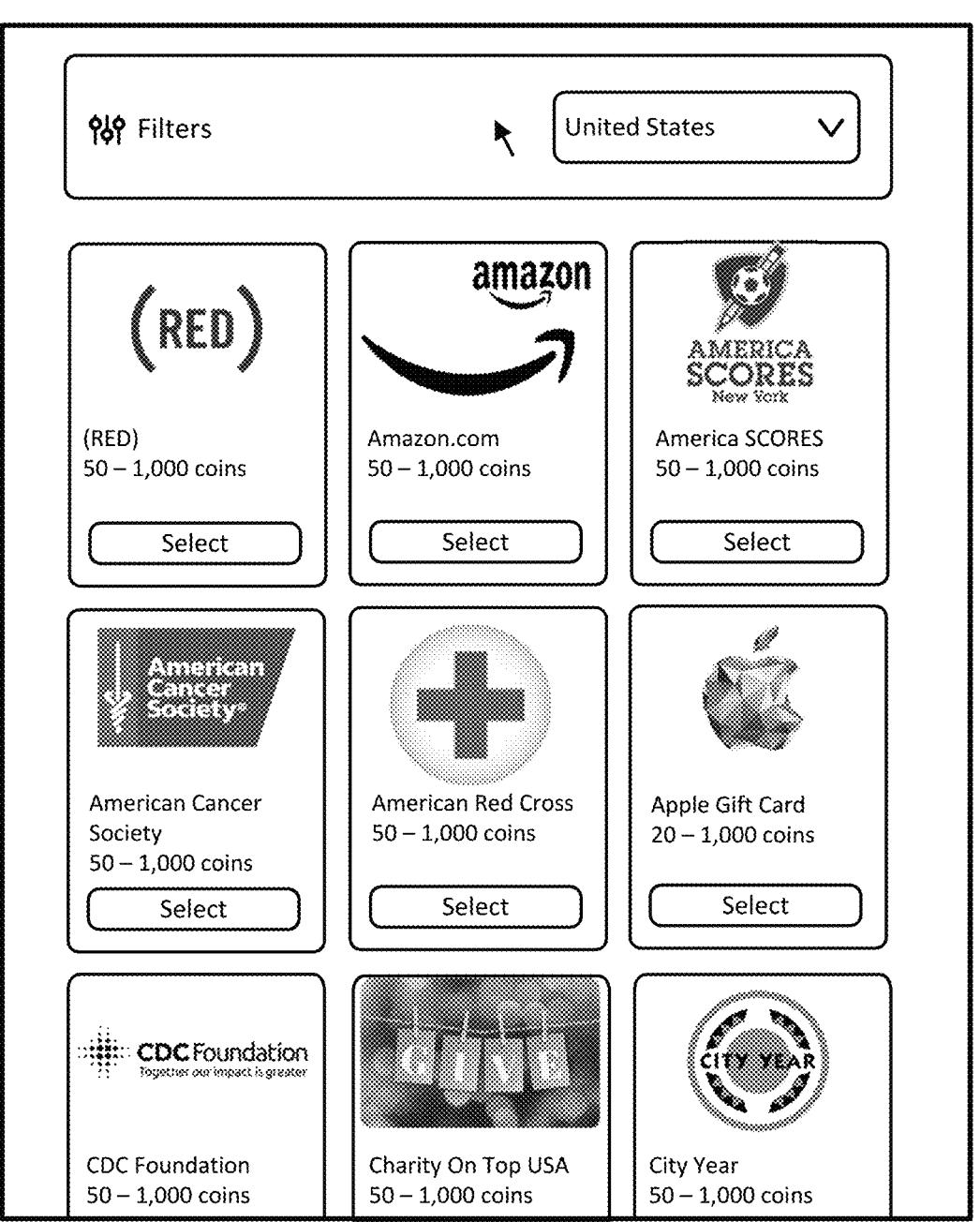
FIG. 5N illustrates a GUI configured to allow users to redeem virtual currency into awards, in accordance with some embodiments.
Figure 50:
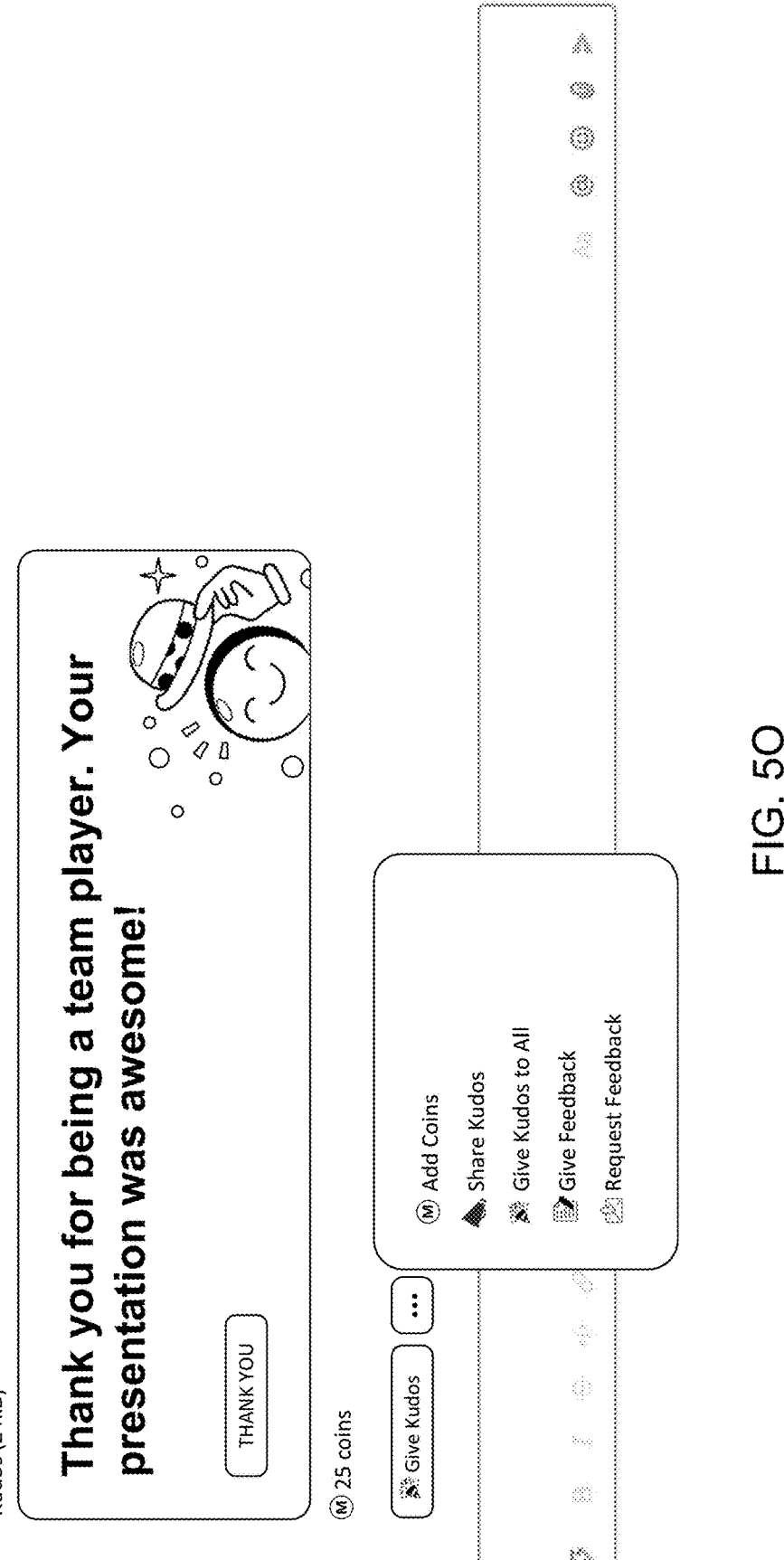

FIGS. 5A-5N illustrate examples of GUIs of the user application 112. FIG. 5A illustrates an example GUI 500A for creating a new feedback messaging channel, which may be displayed for an admin user. The admin user can set a name for the new feedback messaging channel, and add additional users to the feedback messaging channel.

FIG. 5B illustrates an example home page 500B of a user in a feedback messaging channel. The home page 500B shows a list of interactive elements, including interactive elements for "give kudos", "give feedback", "request feedback" and "add people to channel." The user can click each of the interactive elements to give kudos (e.g., positive feedback) to other users in the channel, give feedback (e.g., constructive feedback) to other users in the channel, request feedback, and add people to the channel.

In some embodiments, the home page 500B also shows an amount of virtual currency the user currently has, and how much virtual currency the user has earned. In some embodiments, the home page 500B also shows reminders (e.g., "feedback Friday" reminder), reminding the user to send out feedback messages.

In some embodiments, the home page 500B also shows an interactive element, allowing the user to create their own feedback templates, such as kudos templates.

FIG. 5C illustrates a GUI 500C that presents feedback messages received by a user. In some embodiments, the feedback messages may be shown as sent out by a chatbot provided by the feedback system 102. In some embodiments, the feedback messages may be shown as sent out by a feedback giver. In some embodiments, the feedback messages may be shown as sent out by an admin user.

FIG. 5D illustrates a GUI 500D that allows a user to preview a feedback template (e.g., kudos templates). The template includes a title 510D, e.g., "amazing job," a background 520D, e.g., a background color, or a background image, and an image 530D, which is placed on top of the background. A personalizable message 540D, e.g., "Keep up the great work. You crushed it this week!" is placed on top of the template.

FIG. 5E shows a GUI 500E that presents a list of feedback templates. A user can select one of the feedback templates to generate a feedback message based on the selected feedback template. In some embodiments, templates include some templates relating to (1) the organization's value, (2) an inside joke among users of the channel, or (3) a skill required by the organization of the users of the channel.

FIG. 5F shows a GUI 500F that allows a message-sending user to enter a recipient user's name, and enter a text entry to customize the feedback template when generating a feedback message. In some embodiments, the message-sending user is also able to add an amount of virtual currency to the feedback message. When an amount of virtual currency is included in a feedback message, the amount of virtual currency will be transferred from the message-sending user to the recipient user when the feedback message is sent. In some embodiments, the message-sending user is also able to set whether the feedback message is to be public or private. A public message will be visible to all the users in the channel. A private message can only be seen by the recipient user.

FIGS. 5G-5H illustrate example GUIs 500G and 500H that present reminders for reminding users in the channel to send out feedback messages. The reminders and their sending times may be set by an admin user. In some embodiments, the reminder is a private message that is displayed only to the first user. In some embodiments, the reminder is a public message that is displayed to multiple users of the channel. In some embodiments, the reminder is based on tracked messages sent between the first user and the second user. In some embodiments, the reminder is based on tracked messages sent between multiple users of the channel, including the first user, the second user, and other additional users. For example, in some embodiments, private reminders are sent to the users who have not sent a preset number of feedback messages in a preset period of time. As another example, in some embodiments, private reminders are sent to the users who have sent feedback messages to each other, but have not sent any feedback messages recently, etc.

FIG. 5I illustrates an example GUI 500I that presents a wrap up message that summarizes statistics associated with feedback messages sent to and from users of a channel. The statistics include a number of feedback messages sent and received by each user, and the messages includes a leaderboard of which users of the channel have sent or received a highest number of feedback messages. In some embodiments, the statistics are computed periodically, and a same user is not listed on the leaderboard for consecutive periods.

In some embodiments, a first can also request a feedback from another user. Such a request may be set as continuous at a predetermined frequency. FIG. 5J illustrates an example GUI 500J that allows a user to set up a continuous feedback request. As shown in FIG. 5J, the user can select a frequency for the feedback request, choose one or more skills that are to be requested for feedback, and enter a personalized message with the feed back request.

FIGS. 5K-5L illustrate GUIs 500K and 500L configured to allow an admin user to set a feedback program (e.g., "feedback Friday" program) for an organization. The admin user can enter a predetermined time or date for sending out a kickoff message, a reminder message, and/or a recap message. As shown in FIGS. 5K-5L, multiple reminders may be set, for example, a mid day reminder at 1:00 pm, a last call reminder at 3:45 pm, etc.

FIG. 5M illustrates an example GUI 500M configured to allow a user (or any user who is given a permission to modify templates) to create a kudos template. The GUI 500M prompts the admin user or user to enter a title, select a color, and/or upload an image. Note, this is merely an example embodiment. Additional settings may also be included in the GUI 500H, such as font color, font size, multiple images, etc.

FIG. 5N illustrates an example GUI 500N configured to allow users to redeem virtual currency into awards, such as gift cards of different vendors, donation to non-profit organizations, lunch with an executive of a company (such as a CEO), etc.

FIG. 5O illustrates an example GUI 500O configured to allow users to add coins to a kudos message, or add coins to existing kudos or share kudos with another platform. As illustrated, a user named Sam has given kudos to another user, Brett, recognizing Brett as a "team player" with a specific message praising Brett's presentation skills. When another user clicks the three-dot icon next to the "Give Kudos" icon, a dropdown list appears that provides several interactive options, such as "Add Coins," "Share Kudos," "Give Kudos to All," "Give Feedback," and "Request Feedback." The "Add Coins" option allows the user to add additional virtual currency (e.g., coins) to the kudos, potentially increasing its value or recognition level. The "Share Kudos" option provides a way to share the kudos message with other users or possibly on another platform, enhancing the kudos' visibility.

Figures 1, 2, 5P:
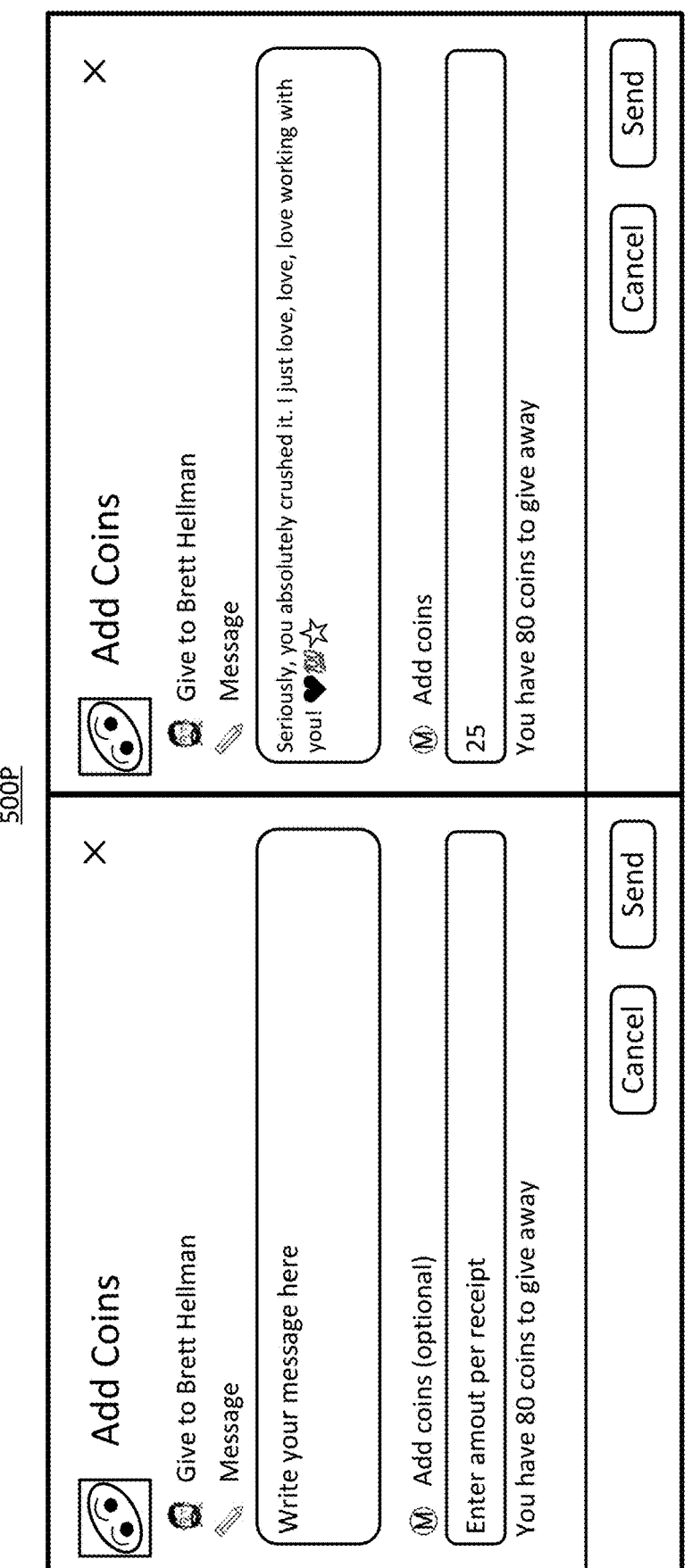

FIGS. 5P-1 and 5P-2 illustrate an example GUI 500P configured to allow users to add virtual currency (e.g., coins) to a message. The GUI 500P may be presented after the user selects the "Add Coins" option in GUI 500O. The GUI 500P includes an "Add Coins" dialog box where the user can add a message and allocate a certain amount of virtual currency (e.g., coins) to another user. The "Message" field allows the user to write a custom message to accompany the coins. The "Add Coins" field allows the user to specify the number of coins to give. The system indicates that the user has 80 coins available to allocate. A "Send" button allows the user to send the message and the coins to Brett. A "Cancel" button is provided to exit the dialog without sending the message or coins.

FIG. 5Q illustrates an example GUI 500Q after coins have been added to a kudos message. As illustrated, the GUI 500Q includes a reply section indicating that one reply has been given to the original kudos message. A user can click the "Reply" link to expand and see the reply message and the coins added to the original kudos message.

Figure 5R:
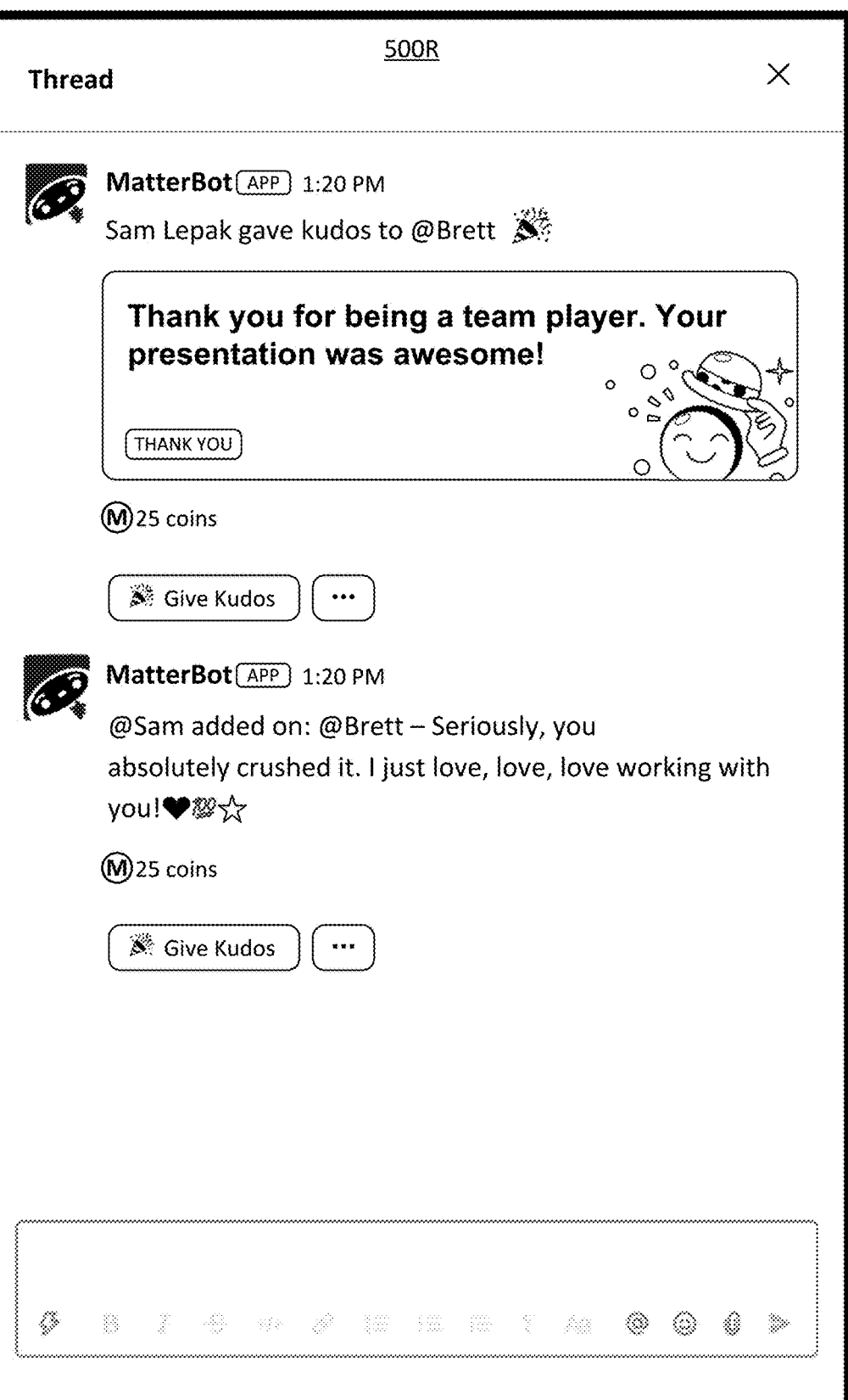
FIG. 5R illustrates an example GUI where a follow-up message is displayed within the same thread as an original kudos message, in accordance with some embodiments.

FIG. 5R illustrates an example GUI 500R where a follow-up message (e.g., a reply message and coins given) is shown in the same thread as the original kudos message. The follow-up message shows that Sam added another message directed to Brett. The follow-up message also includes 25 coins. The threaded view groups the initial kudos and the follow-up, creating a cohesive conversation around the kudos and allowing for further replies and engagement, with a "Reply" field at the bottom where users can add comments.

Figure 5S:
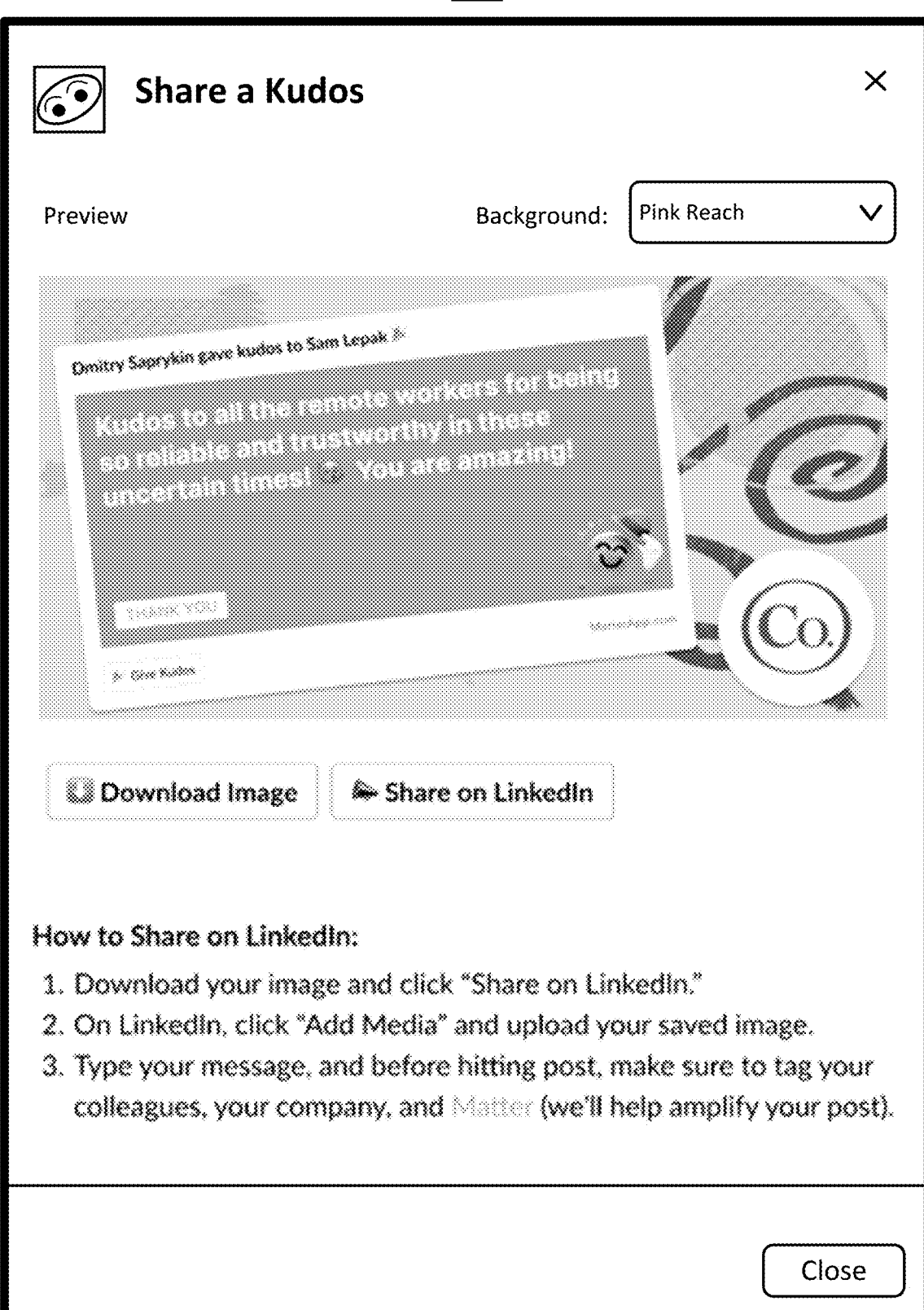
FIG. 5S illustrates an example GUI associated with a "Share a Kudos" feature, allowing users to share a kudos message across different platforms, in accordance with some embodiments.

As discussed above with respect to FIG. 5O, a user is also given the option of sharing the kudos message with other groups and/or platforms. FIG. 5S illustrates an example GUI 500S associated with the "Share a Kudos" feature. After the user selects the "Share Kudos" option, GUI 500S may be displayed. GUI 500S includes a kudos preview section, where a user can select a background. The sharing options include "Download Image" and "Share on LinkedIn." The "Download Image" option allows the user to download the kudos image for sharing on different platforms or saving for later use. The "Share on LinkedIn" option offers a direct method to share the kudos on LinkedIn or another social media platform, encouraging public recognition of the recipient's accomplishments. GUI 500S may also include an instructions section to show users how to manually share the kudos image on different social media platforms.

Figure 5T:
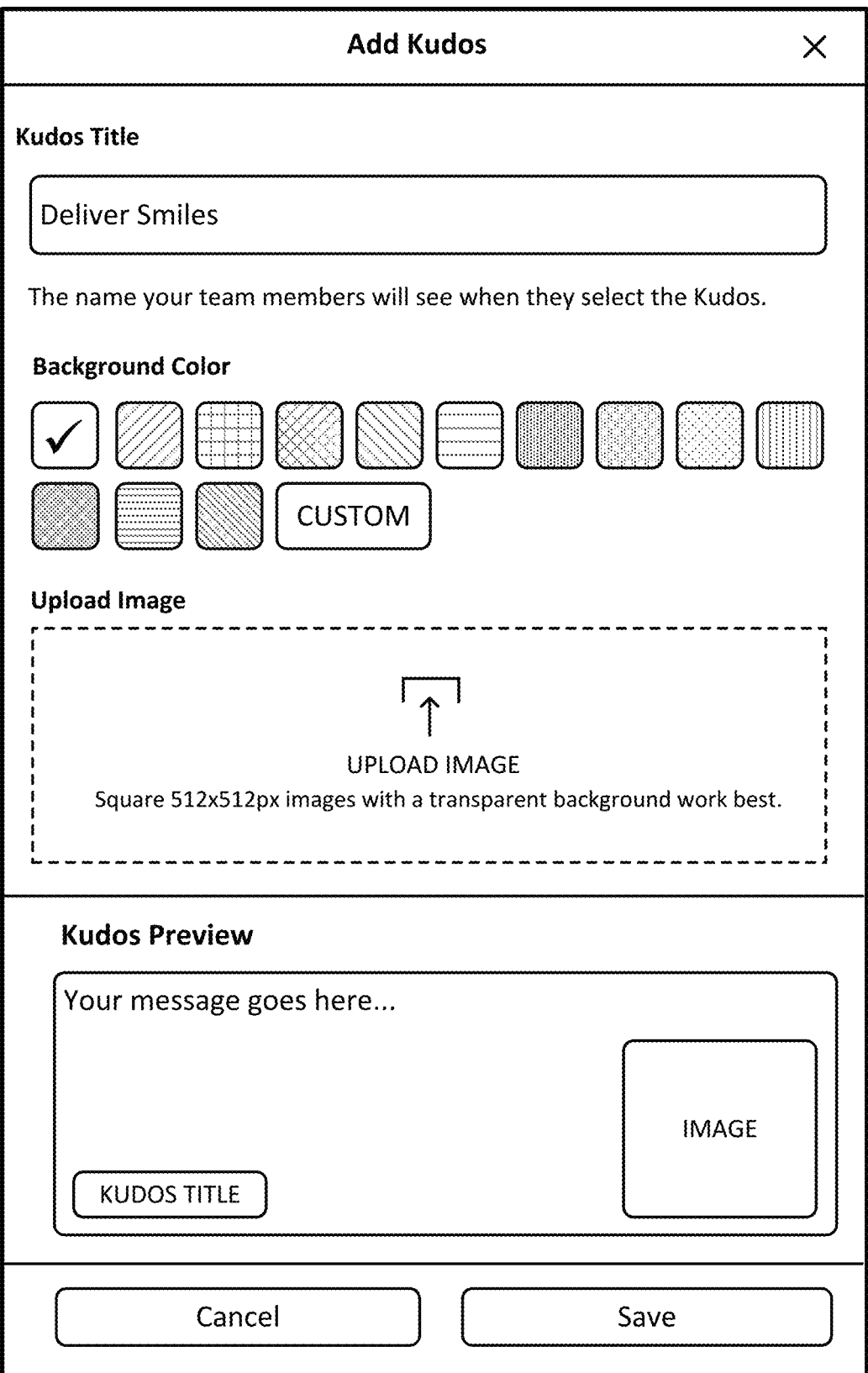
FIG. 5T illustrates an example GUI for creating a custom kudos template, enabling users to personalize recognition messages, in accordance with some embodiments.

In some embodiments, users are allowed to generate custom kudos templates using animated GIFs or videos. FIG. 5T illustrates an example GUI 500T for creating a custom kudos template, allowing users to personalize recognition messages for their team. GUI 500T includes a "Kudos Title" field, a "Background Color" field, an "Upload Image" section, and a "Kudos Preview" section. The "Kudos Title" field allows users to name the kudos template. The "Background Color" field allows users to choose from a selection of background colors. Users can also select a custom color, giving flexibility to align with team or company branding. The "Upload Image" section allows users to upload an image or a video. The image or video may be in a specific format (512×512 px), ideally with a transparent background for optimal visual integration. Alternatively, the system automatically formats any given image or video into the specified format for integration. The "Kudos Preview" section displays a live preview of the kudos template, showing how the title, background, and uploaded image (or GIF or video) will appear in the kudos template. The preview section may include placeholders: "Your message goes here . . . " for the text and "Kudos Title" for the title, giving users an idea of the final look of a kudos message. There are also action buttons, such as "Cancel" and "Save" buttons, allowing users to exit without saving the template or save the kudos template, making it available for future use by the user or their team.

Figure 5U:
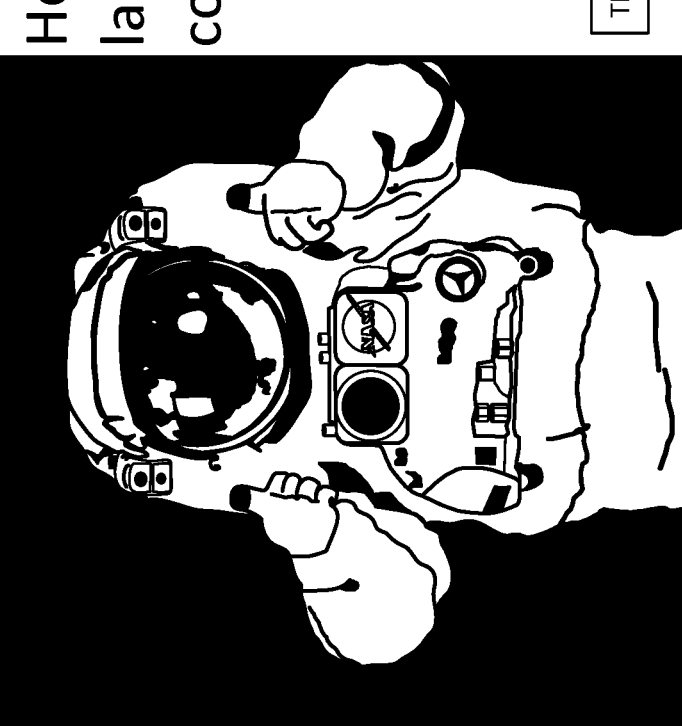
FIG. 5U illustrates an example kudos message (also referred to as a message card) generated by a user, in accordance with some embodiments.

FIG. 5U illustrates an example of a kudos message 500U (also referred to as a message card) generated by a user. The kudos message 500U includes visual content, message text, and a kudos title label. The visual content is the image, GIF, or video that was embedded in the template. As illustrated, the left side of the kudos message 500U features a GIF of an astronaut giving a double thumbs-up, adding an animated and celebratory element to the kudos message. The message text is a personalized message that acknowledges the recipient's recent success and reliability, using an enthusiastic tone. The kudos title label is "Team Player," which appears at the bottom of the text section, making it clear that the recognition is for being a supportive and reliable team member.

FIG. 5V illustrates an example GUI 500V for setting up a survey where rewards, notifications, and survey details can be customized. GUI 500V includes a rewards section, a notifications section, and a review survey details section. The rewards section allows a user to enable or disable a rewards system for survey participation. If enabled, a specific number of coins (e.g., 20 coins equivalent to $2 USD) is awarded to each participant who completes the survey. This incentive has been proven to boost response rates by 35%. The notifications section provides an option to receive real-time notifications whenever a new survey response is submitted, e.g., via MatterBot on Slack. The notifications section may also provide an option to receive a weekly summary of responses, consolidating survey feedback in a digest format. The review survey section allows the user to review a summary of the survey settings, including (but not limited to) the title of the survey, whether the survey is marked as anonymous, the number of questions each recipient will receive, the organization listed as the sender, the number of recipients, the delivery time, the closing date, and rewards. There are also action buttons, such as a "Preview in Slack" button and a "Launch Survey" button, allowing the user to preview how the survey will appear in Slack before launching and/or distribute the survey to the designated recipients.

Once the survey is launched, designated recipients will receive it as a message. FIG. 5W illustrates an example message 500W inviting a user, Avery, to participate in a survey within their workplace. The message 500W includes a personalized greeting, a survey introduction, an anonymity assurance, a coin reward, and a "Start Survey" button. The message highlights that participants will receive 20 coins upon completing the survey, providing an incentive to encourage participation. This reward adds gamification and motivation to the feedback process. The user can press the "Start Survey" button to begin the survey from the message. This call-to-action makes it convenient for users to participate with a single click.

Figure 5X:
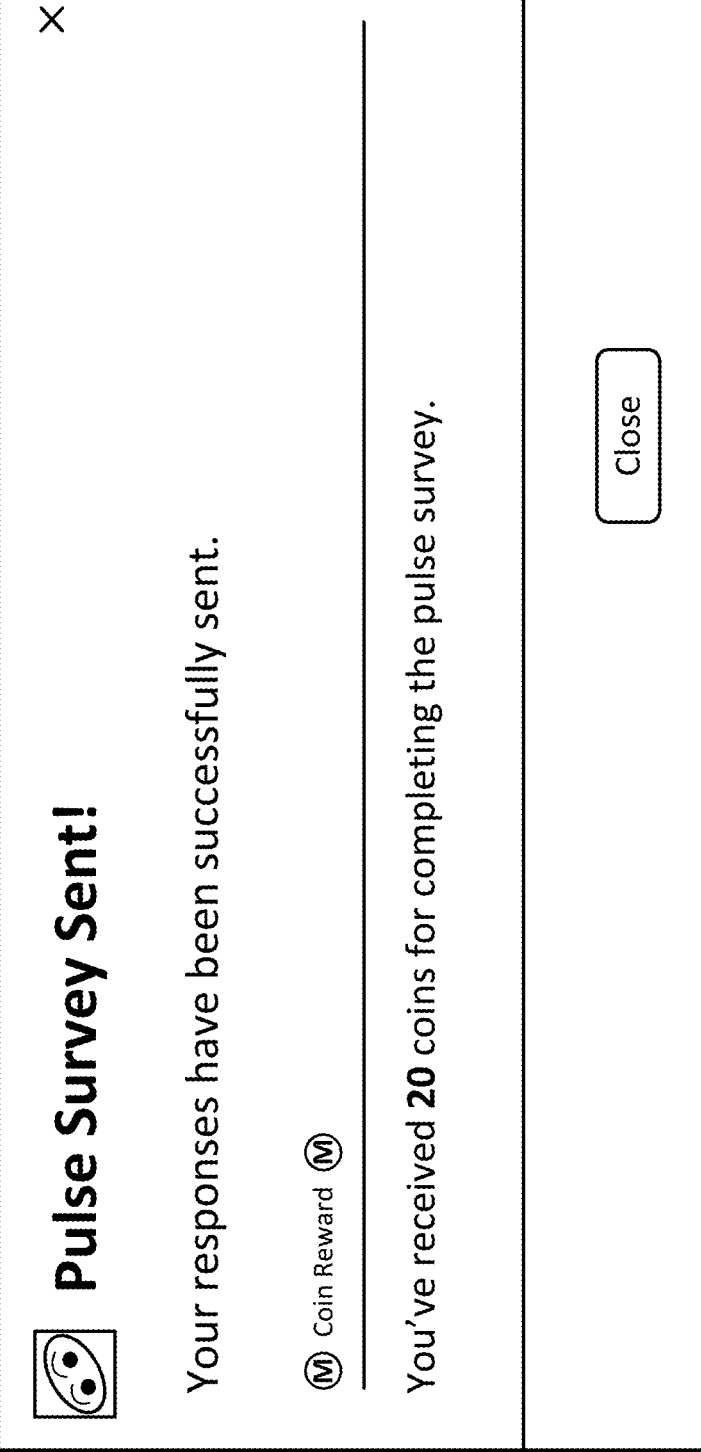
FIG. 5X illustrates an example confirmation message that may be sent to a user after they complete a survey, in accordance with some embodiments.

Once the user submits the survey, they will receive a confirmation message including the 20 coins. FIG. 5X illustrates an example confirmation message 500X that may be sent to a user after they complete a survey. The message 500X includes a confirmation, a coin reward notification, and a "Close" button. The confirmation indicates that the user's responses have been successfully submitted. The coin reward notification highlights that the user has earned 20 coins as a reward for completing the survey. This acknowledgment reinforces the incentive promised before the survey. The "Close" button allows the user to exit the confirmation screen once they have reviewed their reward and submission status.

Example Use Cases

In some embodiments, a channel in a work environment is also referred to as a workspace. Workspaces are a basic unit within the feedback system 102. A workspace is used to gather a team, company, or other group into a single (virtual) location where they can feedback with one another.

"Feedback ritual" is an example embodiment or program that may be offered by the feedback system 102 that encourages users within a work environment to give feedback messages on particular days. In some embodiments, a feedback ritual may include a cycle (such as weekly, bi-weekly, etc.), and a day in the cycle (such as Friday, Thursday, etc.), which is the day each cycle starts or ends. When a feedback ritual is set for a workspace, the members in the workspace are reminded to send feedback messages to each other throughout the cycle based on preset reminders. On the day each cycle ends, the feedback system may compute statistics based on the feedback messages sent among the members of the workspace during the cycle, and generates a wrap up message, summarizing the statistics.

Feedback ritual encourages users within a work environment to give feedback messages on Friday or any day set for the cycle. Other embodiments may use other schedules (not just Fridays) in other environments (not just work environments). Other embodiments may not use all of the features described below and/or may use additional features not described below.

Feedback ritual is an innovative way for workspaces to feedback periodically by dedicating a day where your team is encouraged to give the gift of feedback and share recognition (e.g., kudos). The concepts illustrated by Feedback ritual may also be implemented on other schedules, such as feedback day, feedback Friday, feedback time, feedback Monday, feedback Tuesday, feedback Wednesday, Thankful Thursday, and feedback Thursday, which are all examples of feedback ritual. Note, a weekly feedback cycle is merely an example embodiment. Each organization or workspace may set its own cycle based on preference, such as bi-weekly, monthly, or quarterly.

Feedback ritual is a feature that creates a habit and encourages feedback amongst a workspace (e.g., team or company). For example, the feedback system 102 notifies and reminds participants throughout the day to dedicate time to share feedback with one or more people. The feedback can be positive, like a kudos, aka positive feedback message, which increases a person's motivation, and confidence, and shows people you value them. Positive feedback also encourages a person to exhibit more of the same behavior, which results in greater productivity. Feedback can also be constructive, for example, in a particular area or skill, you could improve by doing something suggested. Example skills include verbal communication, presenting, and body language.

"Feedback Friday" is an example embodiment of feedback ritual. Using "feedback Friday" as an example, throughout a feedback cycle (i.e., a week between two Fridays), the feedback system 102 shares public progress with the workspace. The progress starts based on when the last feedback Friday concluded, not just on Friday. Friday serves as a reminder and a dedicated time to remind people to feedback with one another.

In some embodiments, by default, feedback Friday is scheduled to run every Friday with a kickoff message in the morning, followed by reminders throughout the day, and concluded with a recap at the end of the day, while scheduling is fully customizable.

In some embodiments, reminders are sent publicly to the entire workspace and also privately to individuals. All reminders are customized based on previous workspace and individual activity in order to optimize for the greatest participation rate across the individual and team.

Feedback ritual is fully customizable, with options including: cadence, weekly is the default option; other options include bi-weekly, tri-weekly, monthly, and/or day of the week. Messages may include (but are not limited to) the following customizable options: delivery time, message, and sender (chatbot or a workspace member). For example, messages may include (but are not limited to) a kickoff message, a mid-day reminder, an afternoon reminder, and an end-of-day recap.

In some embodiments, the feedback system 102 is aware of a user's timezone and sends automated messages according to the user's timezone. A workspace can customize its timezone. In some embodiments, the feedback system 102 is also aware of a user's local holidays, and skips days where this is a holiday as people are not working on that day.

In some embodiments, the kickoff message is sent to the entire workspace, personalized by previous workspace activity, individual member activity, and/or overall workspace membership. In some embodiments, the kickoff message is personalized by analyzing the group's previous workspace and individual member activity in order to share a kickoff message that will yield an increase in feedback activity over a default message.

In some embodiments, machine learning is used to analyze feedback messages to identify images and/or reminders that may lead to an increase in feedback amongst members. Machine learning looks at the past activity for this workspace along with all the other workspaces on the feedback system 102 to find the optimal image.

In some embodiments, machine learning is used to provide the workspace with an achievable feedback goal for feedback Friday. Factors include past feedback history, workspace member recency, workspace member messaging communication, calendar meeting activity throughout the week, and the recency of workspace members who joined the workspace.

In some embodiments, some reminder messages are sent to the entire workspace, personalized by past feedback activity, collaborative activity, and/or overall workspace activity. In some embodiments, the personalized reminder messages are sent one or more times throughout the day to the entire workspace to encourage participation in feedback Friday. These reminders serve as nudges, and pokes to encourage full team participation.

In some embodiments, machine learning is used to understand what is an achievable number of feedback the group should send for this particular feedback Friday. Factors may include (but are not limited to): past feedback activity, workspace member recency, workspace member collaborative activity via messaging communication, workspace member calendar meeting activity throughout the week, and/or recency of workspace members who joined the workspace.

In some embodiments, some reminder messages are sent to individuals, personalized by past feedback activity, collaborative activity, and overall workspace activity. Individual workspace members can be sent one or more reminder messages to participate in feedback Friday. Factors that determine if an individual workspace member should receive a reminder message may include (but are not limited to): typical feedbacking time, expected number of feedback sent on Friday, collaboration activity in the past week, etc.

Each member has a typical time when they usually send feedback on feedback Friday. Some members prefer early in the morning, others prefer later in the day, and so on. Feedback system 102 uses machine learning to determine the likely time of feedback per individual workspace member. If their typical feedback time has passed, the feedback system 102 knows they should be reminded.

Each member sends a typical number of feedback messages on a feedback Friday. The feedback system 102 uses machine learning to calculate each individual's typical number of feedback messages sent on feedback Friday. The Feedback system 102 then uses this number to know if the member is behind and if they should be reminded to participate in feedback Friday before its conclusion.

Collaboration activity in the past week may also be analyzed by machine learning. The Feedback system 102 uses machine learning to analyze the members' communication, messaging activity and/or calendar schedule to determine how actively collaborative this individual was with one or more members of the workspace. If the user has been highly collaborative since the last feedback Friday, a greater weight of expected feedback is expected vs. a member with fewer interactions.

In some embodiments, an end of day feedback Friday recap is sent to the entire workspace, personalized by machine learning. For example, an end of day recap is sent to the workspace to celebrate workspace participation and accomplishments.

General individual accomplishments may include (but are not limited to): most kudos received, most feedback given, most kudos given, most feedback given, participants (those who shared 1 or more feedback), most virtual currency or coins given and received, and/or streaks based on the previous week and month activity.

Personalized accomplishments that use machine learning may include (but are not limited to): (1) honorable mention(s) which factor in workspace member recency, (2) weight between participants to acknowledge members who received feedback from members they had not previously, and (3) sentiment analysis to determine the level of satisfaction a workspace member has with another member(s). The honorable mention is valuable as it prevents workspace members from gaming the system by simply sending out a large number of low-quality feedback to other members.

In some embodiments, newly added workspace members are given a stronger weight in the algorithm to be more likely to be acknowledged to encourage feedback and an early, positive experience with the feedback system 102.

In some embodiments, an end of day feedback Friday recap is sent to individuals, personalized by machine learning. For example, an end of day recap is sent to the individuals to celebrate individual accomplishments.

Personalized accomplishments that use machine learning may include (but are not limited to): a percentage of feedback to workspace member coverage, such as ensuring equal distribution of feedback sent between colleagues. The feedback system 102 determines who the individual collaborated with since the last feedback Friday and who they have and have not feedbacked with. The feedback system 102 then provides recommendations based on feedback frequency over long periods of time while also factoring in a weighted score based on the level of collaboration between the two individuals. This enables the feedback system 102 to tell the user what percentage of their colleagues they are successfully feedbacking with.

In some embodiments, the feedback system 102 is also configured to compute a score indicating the quality of feedback sent by members of a workspace. The feedback system 102 may analyze the length and sentiment of feedback sent to understand the quality of feedback sent. Feedback messages that are interpreted as clear, conscience, descriptive, and specific may be given scores higher than the alternative.

In some embodiments, the feedback system 102 is also configured to compute and record feedback streaks. The feedback system 102 may scan records going back long periods of time (weeks, months, years) to determine streaks that could not be calculated by a human without tremendous effort, including (but not limited to) X periods (weeks) in a row you've feedback with a workspace member, Xth time you've sent a "Thank You" type Kudos Template, and/or various fun facts.

In some embodiments, machine learning is used to identify fun, random facts that are only achievable in a short time by computers to motivate and reward the members for feedback. Below shows a few examples of fun facts that may be identified by machine learning.

Fun fact: You send most of your kudos at this time of the day: XX:XX:XX:XX

Fun fact: You send your highest quality feedback at this time of the day. Quality being determined by sentiment analytics and the level of appreciation received by the receiver by either thanking for the feedback or comments with a thank you note.

Fun fact: Your best feedback mentions XYZ skill (ex: body language).

Fun fact: Letting the user know which Kudos feedback they sent, which receive the most EMOJI reactions of all time and how the feedback they sent this week compares.

In some embodiments, the feedback system 102 sends a start of week recap to the entire workspace, personalized by machine learning.

In some embodiments, the feedback system 102 may use machine learning to analyze the workspace's past feedback activity to make recommendations on how to have a more productive week as a workspace.

Recommendations may include (but are not limited to): (1) workspace member distributions, such as XX % of workspace members collaborated with one another since the last feedback Friday, YY % of members feedbacked with one another, or ZZ % is your goal for this week; and/or (2) Streaks, such as last feedback Friday was your X streak (weekly, monthly) where the workspace sent X % above average # of feedback across the workspace.

In some embodiments, a start of week recap is sent to individuals, personalized by machine learning. In some embodiments, machine learning is used to analyze the user's past feedback activity to make recommendations on how to have a more productive week.

Below are some examples of recommendations:

(1) Since last time you have been collaborating with XYZ people but have not shared feedback with X individual(s). The Feedback system 102 recommends you find time to feedback with X this week;

(2) Since last time, you received positive feedback for doing XYZ, keep that up this week; and/or (3) Since last time, you sent X feedback which is Y of your typical rate. Continue your streak by leaving Z feedback this week.

In some embodiments, machine learning may be used to personalize feedback Friday feedback recipient(s) recommendations. In order to encourage the first and ongoing participation in feedback Friday, the feedback system 102 may provide individuals with personalized recommendations to whom they may want to provide feedback.

Factors that weight into the personalized recommendation(s) may include (but are not limited to): (1) who has the user communicated with the most since the last feedback Friday, (2) in the case where this is the first feedback Friday, in the last 30 days, (3) who has the user not given feedback to, (4) who has the user received feedback from, positive or constructive, but not provided feedback to in return, (5) which feedbacks has the user participated in which resulted in the highest level of engagements, (6) emoji reactions on a third party messaging system 130, and/or (7) comments on third party messaging system 130 or within the feedback system 102's web application.

In some embodiments, the feedback system 102 weighs the quality of feedback received and given to create optimal recommendations to ensure the highest quality of feedback for all members.

In some embodiments, machine learning is used to personalize kudos message copy recommendations. To encourage and make it easier for a user to participate in feedback Friday, a pre-populated kudos may be sent to the user. This makes it so the user does not have to write out a feedback but instead can easily send a kudos with a click of a button. This helps the user understand how the product works. The pre-populated copy can be shuffled to help a user find a copy that they are satisfied with.

Factors that weight into the personalized recommendation(s) may include (but are not limited to): (1) which default messages are performing best in this workspace, (2) which default messages are performing best in all workspaces across the Feedback system 102, (3) which default messages are performing best with workspaces similar to the workspace where the feedback system 102 evaluate workspace member size, timezone, and language.

In some embodiments, kudos are sent on the feedback system 102 from one person to one or more people. Kudos can be shared publicly with the entire workspace, or privately with the recipients.

The feedback system 102 provides a workspace with a default set of kudos templates that can be used instantly. They may include (but are not limited to): Amazing Job, Thank You, Team Player, Impressive, Keep It Up, Thoughtful, Inclusive, and/or Cheers.

A workspace's kudos templates can be fully customizable to fit the needs of a team or company. The default set provided by the feedback system 102 can be fully replaced with custom kudos created by the workspace owner or members. Workspaces often create custom kudos to align with a company's values, such as "Open company, no bullshit", "Don't #@!% the customer".

After a user creates a custom kudos, the feedback system 102 may analyze the user's inputs, including name, color, background image, theme, uploaded image, and generates an animated experience to increase the desirability of the custom kudos template for the workspace. This may further increase feedback amongst workspace members.

In some embodiments, the feedback system 102 also allows users to explore, add, use, and remix thousands of kudos templates generated and published by users in different workspaces across the world.

In some embodiments, the feedback system 102 provides new workspaces with a default set of kudos templates that are fully customizable. In some embodiments, workspaces on the feedback system 102 can create custom kudos and share them with other workspaces to be utilized by other workspaces for free or via payment.

In some embodiments, the feedback system 102 provides kudos packs. In some embodiments, the feedback system 102 also allows users of workspaces or third party entities to provide kudos packs. Kudos packs are sets of Kudos centered around a certain theme. Themes can be work related, such as a kudos pack for saying thank you. Themes can also be related to current events, example themes based on a pop culture event like an upcoming movie release.

In some embodiments, the feedback system 102 may also algorithmically recommend kudos and/or kudos pack(s) to workspaces and individuals. The feedback system 102 may use machine learning to determine which type of kudos results in the most feedback amongst a workspace and individual. The feedback system 102 can then use these results to provide kudos and kudos pack recommendations to the workspace and individuals. This may increase feedback amongst workspace members.

Factors that weigh into the personalized recommendation(s) may include (but are not limited to) (1) author, e.g., has a kudos or kudos pack been created by an author that the workspace has used successfully before; (2) similar workspaces usage of a kudos or kudos pack factoring in, geolocation, timezone, workspace member size, and typical feedback activity; (3) pricing, e.g., does the workspace gravitate towards free and/or paid kudos packs, and/or (4) sentiment analytics, e.g., does this workspace use similar phrases as those used in the kudos and/or kudos pack. For example, a younger workspace may use phrases like "That's Fire", an older workspace may use phrases like "Crushing it" or "Rad".

In some embodiments, the feedback system 102 allows organizations to provide monetary rewards to participating workspace members based on workspace member participation. For example, an organization may encourage workspace member participation by providing monetary rewards such as gift cards or cash. The number of monetary rewards given to the group may be determined by the workspace's budget and by the workspace's size, workspace member participation, and the workspace's typical participation rates in previous feedback Fridays. The algorithm determines the least amount of money required to be rewarded to encourage ongoing feedback.

In some embodiments, the algorithm weighs public kudos higher than private kudos, reduces weight between frequent feedback pairs (same two people, to prevent gaming it), and/or constructive feedback weighted higher than kudos based on feedback quality.

In some embodiments, the feedback system 102 allows organizations to provide digital rewards to participating workspace members based on workspace member participation. An organization may want to encourage workspace member participation by providing digital rewards such as Badges (ex: Unicorn, Rockstar). The number of digital rewards given to the group is determined by the workspace's size, workspace member participation, and the workspace's typical participation rates in previous Feedback Fridays. The algorithm determines the optimal amount of digital rewards required to be rewarded to encourage ongoing feedback and maintain the value of digital rewards.

In some embodiments, monetary and/or digital reward distribution is based on past feedback reward winner activity. The feedback system 102 may be set to prevent the same people from getting rewarded all the time. In some embodiments, the feedback system 102 uses machine learning to look at past feedback activity and reward winners for providing previous winners a weight in the algorithm to be less likely to receive a reward in the given time period. This helps ensure an even distribution of rewards across a workspace which will increase feedback activity.

In some embodiments, the feedback system 102 dynamically generates a video and/or images for feedback Friday rewards raffle winner experience. At the end of feedback Friday, if the workspace has rewards enabled, the winner(s) may be announced publicly to the workspace with a dynamically generated image and/or video. This dynamically generated media file, which may be shared on the user application 112, dynamically displays all the participants of feedback Friday. In some embodiments, at the end of the media file, it shows those who won feedback Friday.

Organizations or workspaces may be given options to provide winners extra virtual currency, which can later be redeemed for a reward, such as gift cards, SWAG, or custom, company-specific items like SWAG or events like lunch with the CEO.

In some embodiments, the system encourages peer-to-peer recognition and track engagement within teams. The system enables users to send feedback messages to their team members, optionally attaching virtual currency as a reward or gift. For example, if an employee recognizes a colleague's contribution to a project via a kudos message, they can attach virtual currency to their kudos message, which the recipient can later redeem.

Users may use customizable kudos templates to recognize achievements within the team. Each template includes a title, background, and multimedia component, allowing users to personalize the message. For example, a template with an animated graphic and the title "Great Job" may be used to celebrate project milestones, adding a fun and engaging way to recognize accomplishments. Users may also create their own templates that integrate their own favorite multimedia component, such as a static image, an animated image, a video and/or an audio.

Further, a user may send a feedback message along with an amount of virtual currency to multiple users. For example, during a project, a team leader sends a group kudos message recognizing the contributions of multiple team members. The message includes virtual currency rewards for each team member, automatically distributing the specified amounts to each recipient. The team leader selects a themed template, adding visual appeal to the feedback message, making it more engaging for the recipients.

In some embodiments, a user may be a member of two different teams having their own separate channels. The user is able to share a feedback message received in one channel in the other channel. Alternatively, or in addition, the user may send a feedback message to a colleague in the first team, with the message published in both the first channel and the second channel. This feature helps promote visibility across teams, encouraging cross-functional recognition and fostering collaboration. The recipient can also share the recognition message on other social platforms, showcasing their achievement to a wider audience. For example, a user receives a multimedia kudos message in a Slack® channel and may choose to share this kudos message on LinkedIn®.

In some embodiments, a first user sends feedback (e.g., a kudos message) to a second user, who can then reply directly within the same thread. Alternatively, or additionally, the feedback from the first user to the second user may be shared publicly in the channel as a visible kudos message. A third user may also engage with the original kudos message by replying to it and adding additional virtual currency to the recipient of the kudos message. The reply could be a simple text message with an amount of virtual currency, or a formalized feedback message (e.g., an additional kudos message) accompanied by virtual currency. This interactive thread structure enables a richer feedback experience and encourages meaningful conversations around recognition.

In some embodiments, the system also tracks and displays statistics, such as the most recognized employee users and the total virtual currency exchanged, fostering a culture of appreciation and engagement. For example, a channel administrator may configure a summary frequency, such that every Friday, employee users receive a summary message in their channel, displaying statistics on the week's feedback activity, such as the total virtual currency exchanged and the most active contributors. Alternatively, or in addition, a monthly summary message is generated at the end of each month. This encourages healthy competition and active participation, as employee users strive to be listed as top contributors or recipients of recognition.

In some embodiments, the system also facilitates administration of surveys within channels. An administrator is able to specify survey parameters via a survey creation interface, which is a GUI. In addition to the survey questions and choices of answers, the survey parameters may also include (but are not limited to) an anonymity setting, a recipient selection (e.g., all users in one or more channels, all users with certain attributes, or manually selected set of users), a closing date, and/or a reward setting for survey participation. The reward setting indicates a virtual currency available upon survey completion.

For example, a management team may create a survey to gather feedback on a recent company initiative, specifying a virtual currency reward for survey completion. Recipients receive a personalized message inviting them to participate and detailing the reward. The system may send reminders to users who haven't completed the survey after a set timeframe (e.g., a week after the survey launch or a week before the survey's closing date). In some embodiments, the reminder includes a call-to-action button that enables users to conveniently click through to access and participate in the survey.

Upon survey completion, the system deposits the designated virtual currency reward into the user's virtual currency account and updates survey-related statistics based on the received responses. These statistics may include, but are not limited to, completion rates, answer distributions for each question, and sentiment analysis. In some embodiments, real-time statistics are displayed in the relevant channel(s) for all participants to view.

In some embodiments, the management team may receive an updated summary of survey responses periodically, including completion rates and sentiment insights. The summary includes visual charts, such as a bar chart showing response distribution across departments, a pie chart of satisfaction levels, and a heatmap highlighting areas needing improvement. This visualization of results can provide insights and support data-driven decision-making.

In some embodiments, the management team may conduct a survey that includes open-ended questions. The system performs sentiment analysis on these responses, identifying positive and negative trends within the feedback. This analysis provides the manager with insights into overall team morale and specific areas where employee users are feeling either satisfied or dissatisfied.

As such, the system enables users to earn virtual currency by responding to regular feedback messages and survey requests. Each user has access to a virtual bank account displaying their virtual currency balance and transaction history, showing all sent and received amounts associated with feedback messages. The virtual bank tracks their currency, which can be redeemed for company-branded rewards, gift cards, or experiences. This gamified approach motivates employee users to participate actively, knowing that their contributions can result in meaningful rewards.

Computing Machine Architecture

Figure 6:
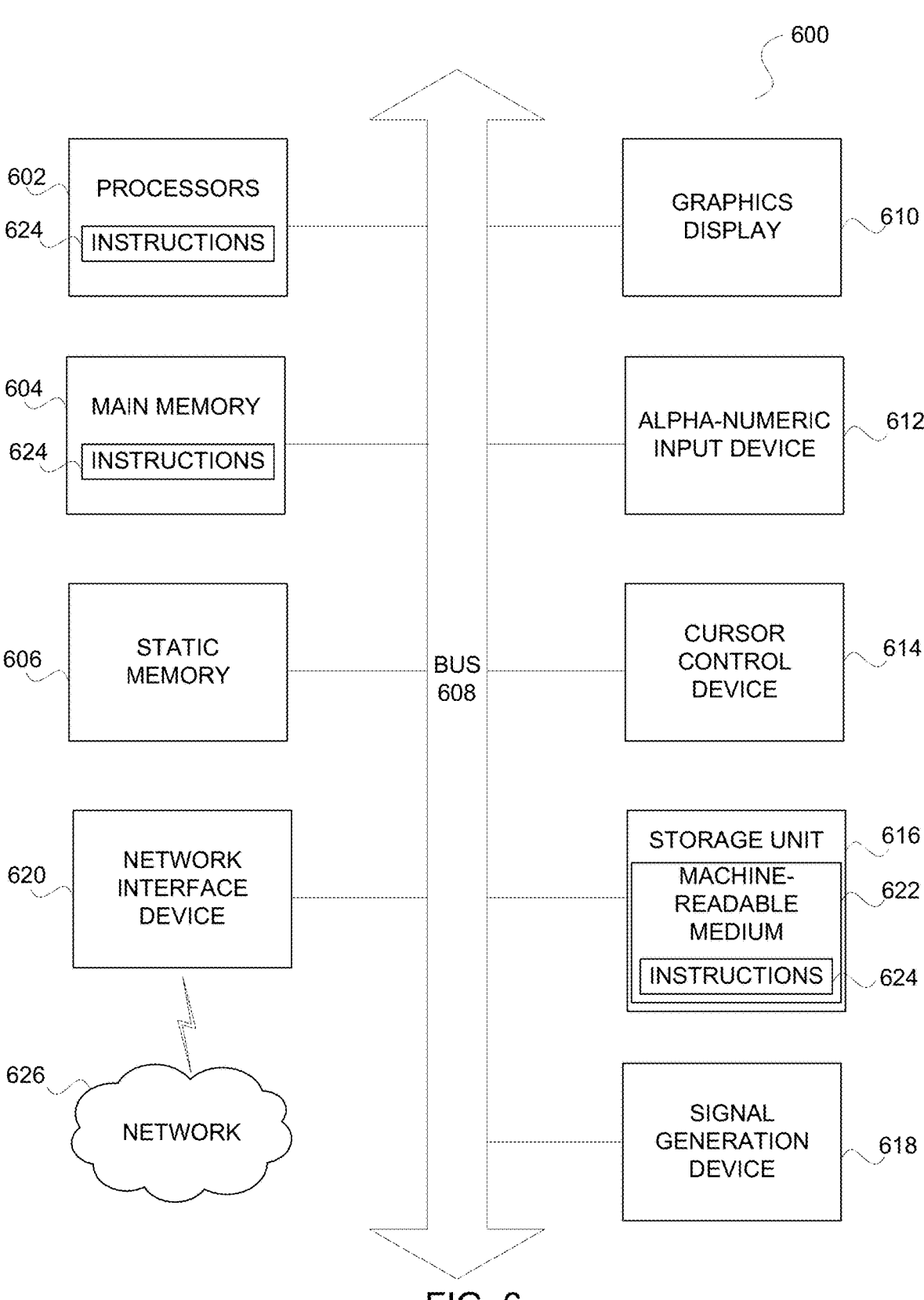
FIG. 6 is a block diagram of an example computing device, in accordance with some embodiments.

FIG. 6 is a block diagram illustrating components of an example computing machine that is capable of reading instructions from a computer-readable medium and executing them in a processor (or controller). A computer described herein may include a single computing machine shown in FIG. 6, a virtual machine, a distributed computing system that includes multiple nodes of computing machines shown in FIG. 6, or any other suitable arrangement of computing devices.

By way of example, FIG. 6 shows a diagrammatic representation of a computing machine in the example form of a computer system 600 within which instructions 624 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 6 may correspond to any software, hardware, or combined components shown in FIG. 1, including but not limited to, the client device 110, the feedback system 102, the third party messaging system 130, and various engines, interfaces, terminals, and machines shown in FIGS. 1-3. While FIG. 6 shows various hardware and software elements, each of the components described in FIGS. 1-3 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 624 that specify actions to be taken by that machine. Further, while only a single machine is illustrated, the term "machine" and "computer" may also be taken to include any collection of machines that individually or jointly execute instructions 624 to perform any one or more of the methodologies discussed herein.

The example computer system 600 includes one or more processors 602 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 600 may also include a memory 604 that stores computer code, including instructions 624 that may cause the processors 602 to perform certain actions when the instructions are executed, directly or indirectly by the processors 602. Instructions can be any directions, commands, or orders that may be stored in different forms, such as equipment-readable instructions, programming instructions, including source code, and other communication signals and orders. Instructions may be used in a general sense and are not limited to machine-readable codes. One or more steps in various processes described may be performed by passing through instructions to one or more multiply-accumulate (MAC) units of the processors.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though in the specification or the claims may refer to some processes to be performed by a processor, this should be construed to include a joint operation of multiple distributed processors.

The computer system 600 may include a main memory 604, and a static memory 606, which are configured to communicate with each other via a bus 608. The computer system 600 may further include a graphics display unit 610 (e.g., a plasma display panel (PDP), a liquid crystal display (LCD), a projector, or a cathode ray tube (CRT)). The graphics display unit 610, controlled by the processors 602, displays a graphical user interface (GUI) to display one or more results and data generated by the processes described herein. The computer system 600 may also include alphanumeric input device 612 (e.g., a keyboard), a cursor control device 614 (e.g., a mouse, a trackball, a joystick, a motion sensor, or other pointing instruments), a storage unit 616 (a hard drive, a solid-state drive, a hybrid drive, a memory disk, etc.), a signal generation device 618 (e.g., a speaker), and a network interface device 620, which also are configured to communicate via the bus 608.

The storage unit 616 includes a computer-readable medium 622 on which is stored instructions 624 embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting computer-readable media. The instructions 624 may be transmitted or received over a network 626 via the network interface device 620.

While computer-readable medium 622 is shown in an example embodiment to be a single medium, the term "computer-readable medium" should be taken to include a single medium or multiple media (e.g., a centralized or distributed database, or associated caches and servers) able to store instructions (e.g., instructions 624). The computer-readable medium may include any medium that is capable of storing instructions (e.g., instructions 624) for execution by the processors (e.g., processors 602) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A method for implementing a computer-based channel for messaging feedback among a plurality of users of the channel, comprising:

tracking messages sent to and from the users of the channel;

generating and displaying to a first user of the channel a reminder to send feedback to a second user of the channel based on the messages tracked between users of the channel;

presenting a total amount of virtual currency that the first user has in a virtual bank account of the first user;

receiving from the first user a text entry and an amount of virtual currency that the first user is to give to the second user;

generating a feedback message based on the text entry;

sending the feedback message from the first user to the second user along with the amount of virtual currency, the amount of virtual currency associated with the feedback message;

transferring the amount of virtual currency from the virtual bank account of the first user to the virtual bank account of the second user;

computing statistics associated with feedback messages sent to and from the users of the channel; and generating and displaying a message summarizing the statistics.

2. The method of claim 1, the method further comprising:

receiving an indication from a third user to reply to the feedback message from the first user to the second user;

generating and displaying a graphical user interface for the third user to input a follow up message and a second amount of virtual currency;

receiving input from the third user that includes the follow up message and the second amount of virtual currency;

generating and sending the follow up message from the third user to the second user associated with the second amount of virtual currency input by the third user; and transferring the second amount of virtual currency from the virtual bank account of the third user to the virtual bank account of the second user.

3. The method of claim 1, further comprising:

receiving from the first user a text entry and an amount of virtual currency that the first user is to give to a plurality of third users;

generating a feedback message based on the text entry;

sending the feedback message from the first user to each of the plurality of third users along with the amount of virtual currency, the amount of virtual currency associated with the feedback message;

transferring the amount of virtual currency from the virtual bank account of the first user to the virtual bank account of each of the plurality of third users.

4. The method of claim 3, wherein generating the feedback message based on the text entry includes:

selecting a template from a plurality of templates, each of the plurality of templates includes a title, a background, and a multimedia component; and integrating the text entry into the selected template to create the feedback message as a multimedia message.

5. The method of claim 4, wherein the multimedia component includes one or more of a static image, an animated image, a video, or audio.

6. The method of claim 1, the method further comprising:

receiving from the second user an indication of sharing the feedback message in the channel;

responsive to receiving the indication from the second user, publishing the feedback message in the channel.

7. The method of claim 1, the method further comprising:

receiving from the second user an indication of sharing the feedback message in a second channel different from the channel where the feedback message was generated;

responsive to receiving the indication from the second user, publishing the feedback message in the second channel.

8. The method of claim 1, the method further comprising:

receiving from the second user an indication of sharing the feedback message in a second platform different from an online platform hosting the channel;

responsive to receiving the indication from the second user, publishing the feedback message on the second platform.

9. The method of claim 1, the method further comprising:

generating a leaderboard in the channel based on the computed statistics, wherein the leaderboard displays users who have sent or received a highest number of messages or virtual currency within a predefined period.

10. The method of claim 1, the method further comprising:

generating a summary of feedback activity in the channel within a predefined period, including statistics on a total virtual currency transferred, a number of feedback messages exchanged, and most active users.

11. The method of claim 1, wherein the virtual bank account of each user is accessible via a user interface that displays a transaction history, showing all sent and received virtual currency amounts and associated feedback messages.

12. A method for implementing a computer-based channel for conducting surveys among a plurality of users of the channel, comprising:

generating and displaying a survey creation interface that allows a user to specify survey parameters, including an anonymity setting, a recipient selection, a closing date of the survey, and a reward setting for survey participation, the reward setting indicating a virtual currency available upon survey completion;

receiving user indication, specifying the survey parameters;

generating and sending a message to each recipient with an option to begin the survey in the channel, the message indicating the virtual currency;

receiving and recording survey responses from each recipient who completes the survey;

updating a virtual currency account associated with each respondent to reflect the virtual currency awarded for completing the survey;

computing statistics associated with results of survey results; and generating and displaying a message summarizing the computed statistics in the channel.

13. The method of claim 12, wherein the survey parameters further include a plurality of survey questions and respective answer choices.

14. The method of claim 12, wherein the message sent to each recipient includes a personalized greeting and a direct call-to-action button to begin the survey.

15. The method of claim 12, further comprising:

sending a reminder notification to recipients who have not yet completed the survey after a first predetermined period has elapsed since an initial survey message was sent or within a second predetermined period before the closing date of the survey, the notification including a call-to-action button to begin the survey.

16. The method of claim 12, wherein the computed statistics include a response rate, an average score for a question in the survey, and an overall survey completion rate among recipients.

17. The method of claim 12, further comprising:

providing real-time updates on a number of responses received in the channel.

18. The method of claim 12, wherein the statistics associated with the survey results include sentiment analysis of open-text responses, providing insights into an overall positive or negative feedback trend.

19. The method of claim 12, wherein the message summarizing the computed statistics includes a visual representation of the computed statistics, wherein the visual representation includes one or more of a bar chart, a pie chart, a line chart, a heatmap, a scatter plot, a histogram, a box plot, a bubble chart, an area chart, a gantt chart, a radar chart, and a waterfall chart.

20. The method of claim 12, the method further comprising:

calculating and displaying, to the channel, survey engagement metrics including one or more of a number of survey views, partial completions, and full completions, in real time.

* * * * *